US012580658B2

(12) United States Patent
Akiyama

(10) Patent No.: US 12,580,658 B2
(45) Date of Patent: Mar. 17, 2026

(54) OPTICAL RECEPTION DEVICE AND OPTICAL TRANSMISSION AND RECEPTION DEVICE

(71) Applicant: FUJITSU LIMITED, Kawasaki (JP)

(72) Inventor: Tomoyuki Akiyama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 17/900,990

(22) Filed: Sep. 1, 2022

(65) Prior Publication Data

US 2023/0208525 A1 Jun. 29, 2023

(30) Foreign Application Priority Data

Dec. 24, 2021 (JP) ................................. 2021-210719

(51) Int. Cl.
H04B 10/294 (2013.01)
G02F 1/21 (2006.01)
H04B 10/40 (2013.01)
H04B 10/61 (2013.01)

(52) U.S. Cl.
CPC ........... H04B 10/294 (2013.01); G02F 1/212 (2021.01); H04B 10/40 (2013.01); H04B 10/614 (2013.01); H04B 10/6166 (2013.01)

(58) Field of Classification Search
None
See application file for complete search history.

(56) References Cited

U.S. PATENT DOCUMENTS

| | | | |
|---|---|---|---|
| 2004/0161241 A1 | 8/2004 | Tomofuji et al. | |
| 2018/0191441 A1 | 7/2018 | Noguchi | |
| 2019/0245642 A1 | 8/2019 | Akiyama | |
| 2021/0126421 A1* | 4/2021 | Tanaka | ................. H01S 5/4068 |
| 2024/0113799 A1* | 4/2024 | Liu | .................... H04Q 11/0005 |

FOREIGN PATENT DOCUMENTS

| | | |
|---|---|---|
| JP | 2004-254018 A | 9/2004 |
| JP | 2019-135524 A | 8/2019 |
| WO | 2017/109830 A1 | 6/2017 |

* cited by examiner

*Primary Examiner* — Eric L Bolda
(74) *Attorney, Agent, or Firm* — Fujitsu Intellectual Property Center

(57) ABSTRACT

An optical reception device includes: an optical demultiplexer that has an input port and output ports, and configured to demultiplex a wavelength-multiplexed signal light input from the input port into a signal light for each wavelength and output the signal light from each of the output ports; a multi-wavelength light output circuit configured to output a wavelength light for each wavelength included in the wavelength-multiplexed signal light to the input port of the optical demultiplexer; and a processor configured to control the optical demultiplexer and the multi-wavelength light output circuit, wherein the optical demultiplexer includes symmetric Mach-Zehnder interferometers that each have a pair of arms of different lengths, and adjustors respectively that adjust optical phases in the asymmetric Mach-Zehnder interferometers, the asymmetric Mach-Zehnder interferometers are connected to each other in a tree-like shape so as to connect the input port and the output ports.

8 Claims, 15 Drawing Sheets

FIG. 4

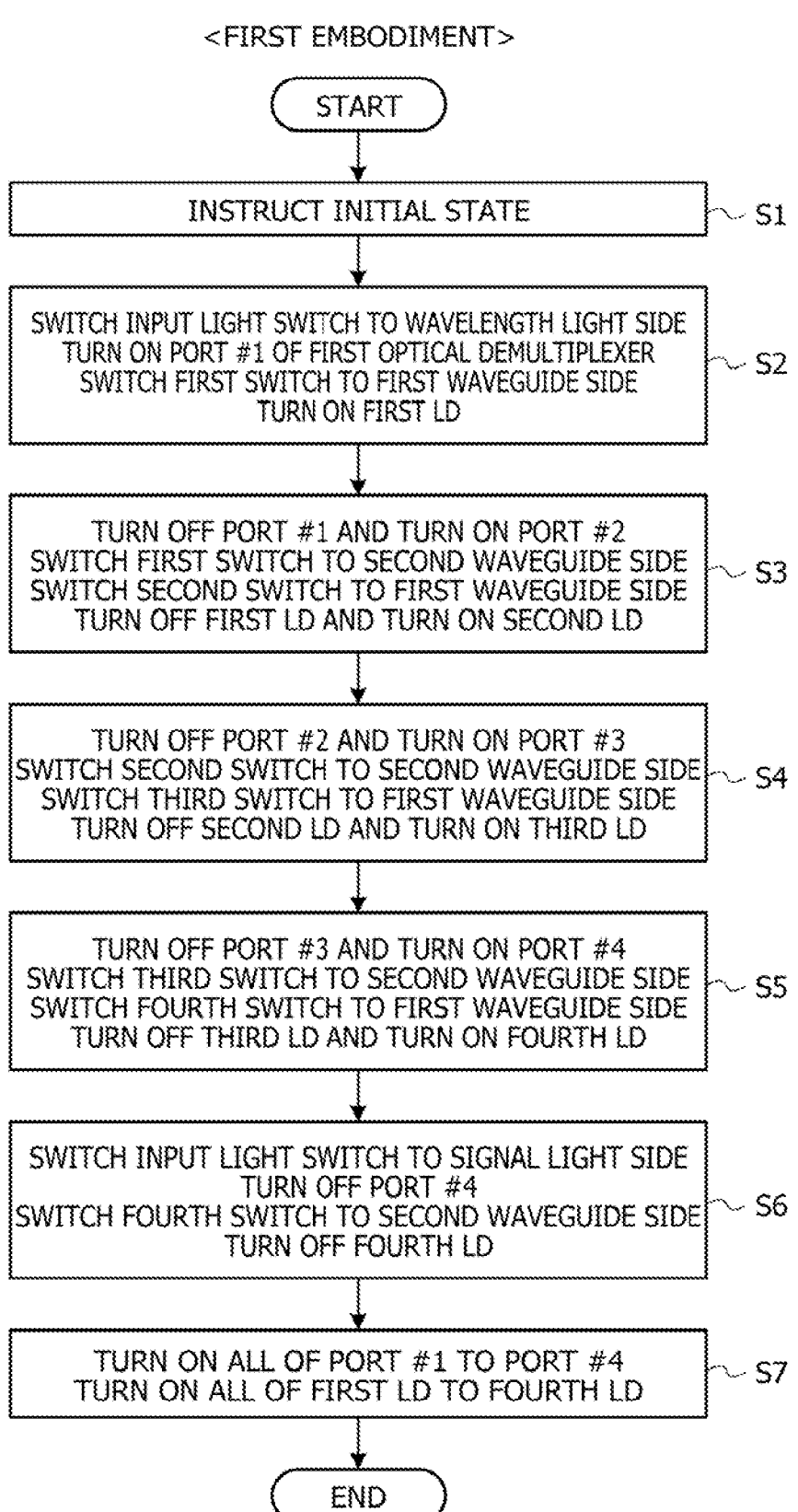

<FIRST EMBODIMENT>

START

INSTRUCT INITIAL STATE ~ S1

SWITCH INPUT LIGHT SWITCH TO WAVELENGTH LIGHT SIDE
TURN ON PORT #1 OF FIRST OPTICAL DEMULTIPLEXER
SWITCH FIRST SWITCH TO FIRST WAVEGUIDE SIDE
TURN ON FIRST LD ~ S2

TURN OFF PORT #1 AND TURN ON PORT #2
SWITCH FIRST SWITCH TO SECOND WAVEGUIDE SIDE
SWITCH SECOND SWITCH TO FIRST WAVEGUIDE SIDE
TURN OFF FIRST LD AND TURN ON SECOND LD ~ S3

TURN OFF PORT #2 AND TURN ON PORT #3
SWITCH SECOND SWITCH TO SECOND WAVEGUIDE SIDE ~ S4
SWITCH THIRD SWITCH TO FIRST WAVEGUIDE SIDE
TURN OFF SECOND LD AND TURN ON THIRD LD

TURN OFF PORT #3 AND TURN ON PORT #4
SWITCH THIRD SWITCH TO SECOND WAVEGUIDE SIDE ~ S5
SWITCH FOURTH SWITCH TO FIRST WAVEGUIDE SIDE
TURN OFF THIRD LD AND TURN ON FOURTH LD

SWITCH INPUT LIGHT SWITCH TO SIGNAL LIGHT SIDE
TURN OFF PORT #4
SWITCH FOURTH SWITCH TO SECOND WAVEGUIDE SIDE ~ S6
TURN OFF FOURTH LD

TURN ON ALL OF PORT #1 TO PORT #4
TURN ON ALL OF FIRST LD TO FOURTH LD ~ S7

END

FIG. 8

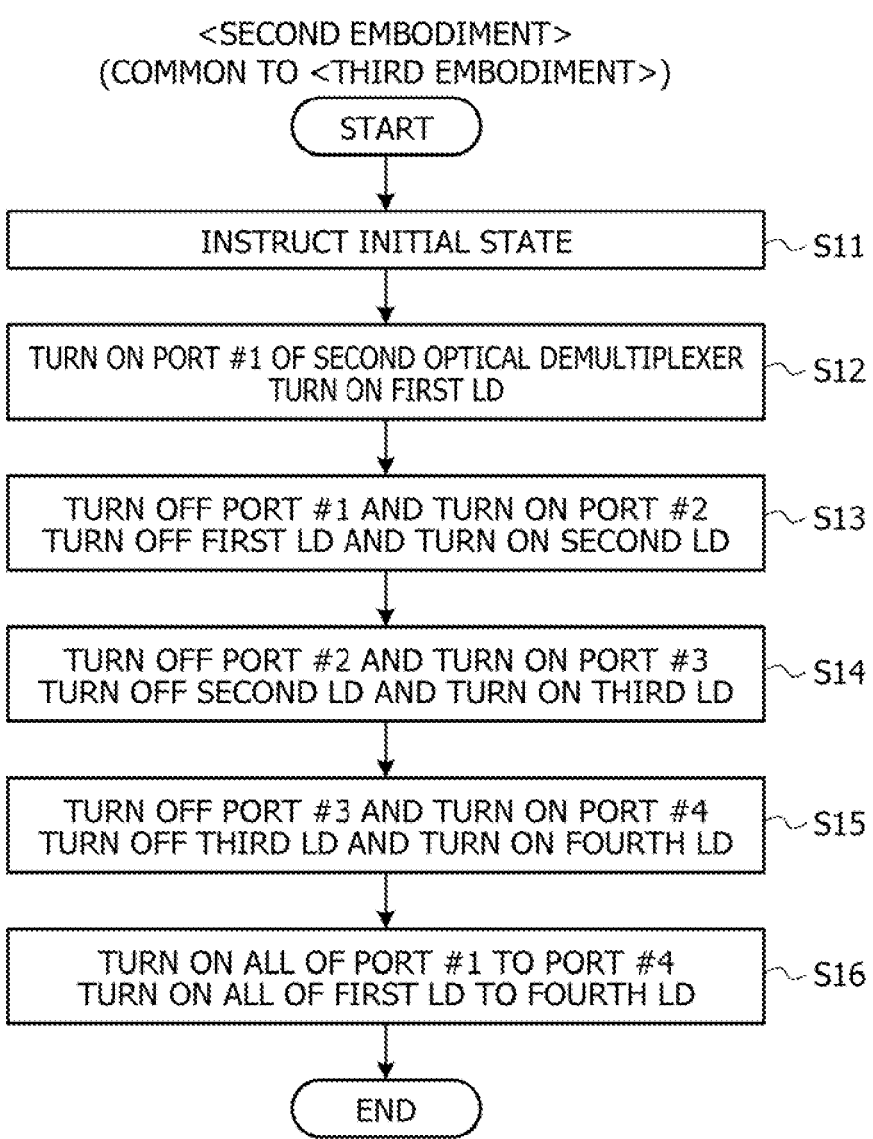

<SECOND EMBODIMENT>
(COMMON TO <THIRD EMBODIMENT>)

START

INSTRUCT INITIAL STATE — S11

TURN ON PORT #1 OF SECOND OPTICAL DEMULTIPLEXER
TURN ON FIRST LD — S12

TURN OFF PORT #1 AND TURN ON PORT #2
TURN OFF FIRST LD AND TURN ON SECOND LD — S13

TURN OFF PORT #2 AND TURN ON PORT #3
TURN OFF SECOND LD AND TURN ON THIRD LD — S14

TURN OFF PORT #3 AND TURN ON PORT #4
TURN OFF THIRD LD AND TURN ON FOURTH LD — S15

TURN ON ALL OF PORT #1 TO PORT #4
TURN ON ALL OF FIRST LD TO FOURTH LD — S16

END

FIG. 12A
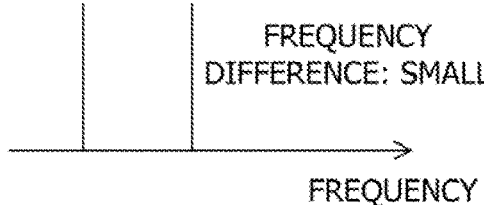
CASE OF ADJACENT
CHANNELS
FREQUENCY
DIFFERENCE: SMALL
FREQUENCY
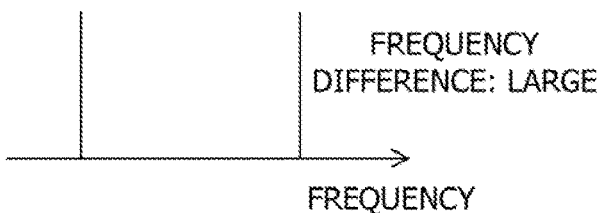
CASE OF NON-ADJACENT
CHANNELS
FREQUENCY
DIFFERENCE: LARGE
FREQUENCY
FIG. 12B
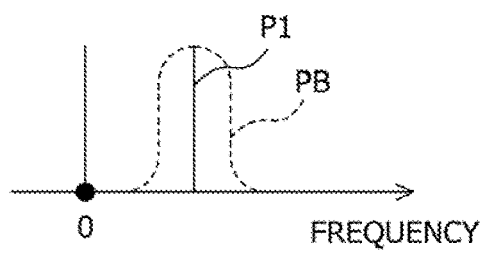
P1
PB
0       FREQUENCY
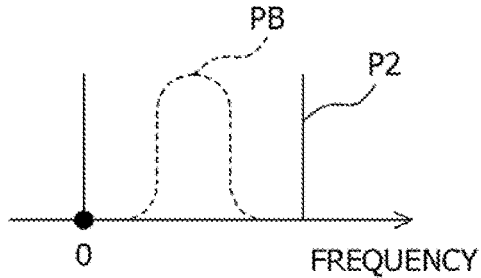
PB
P2
0       FREQUENCY
FIG. 12C
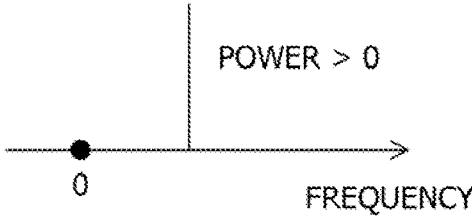
POWER > 0
0       FREQUENCY
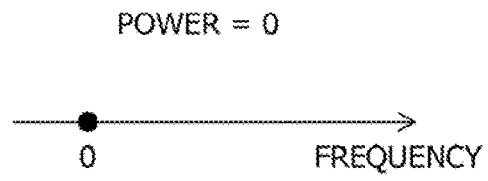
POWER = 0
0       FREQUENCY

<FOURTH EMBODIMENT>

FIG. 14

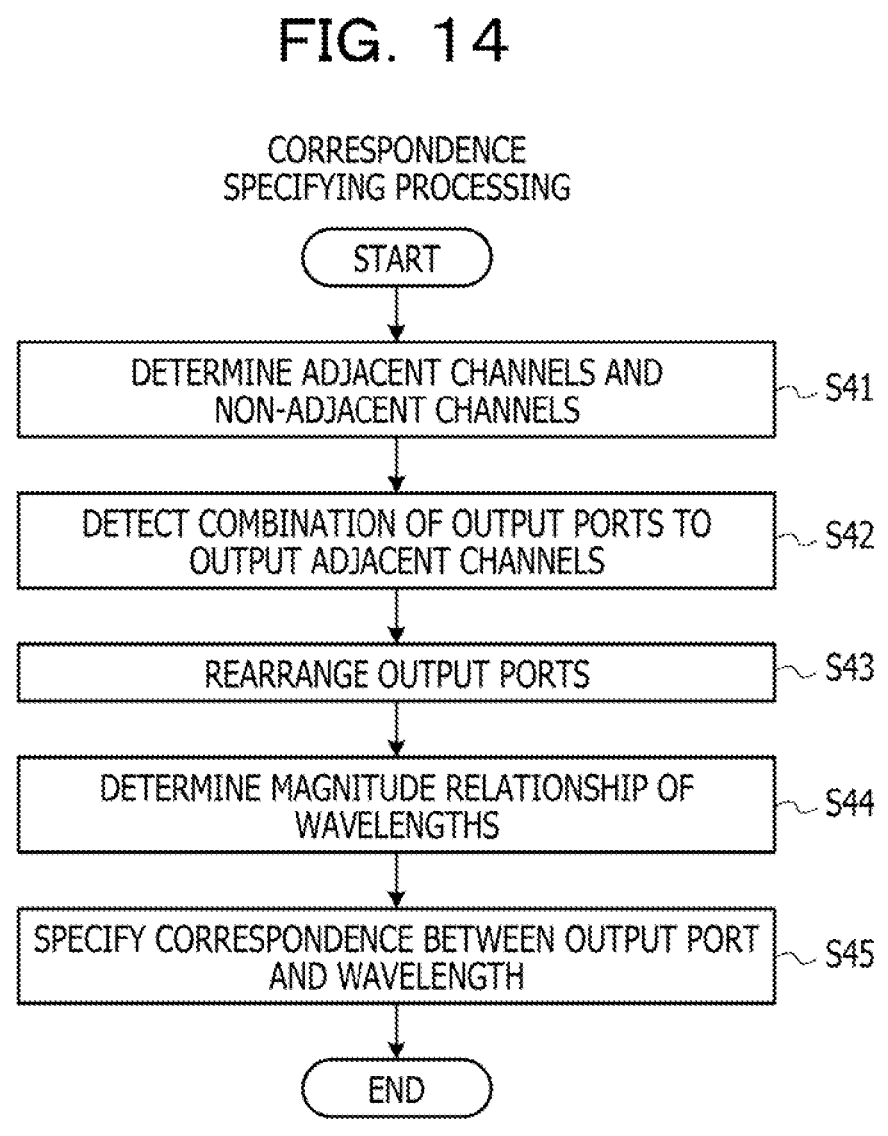

CORRESPONDENCE
SPECIFYING PROCESSING

START

DETERMINE ADJACENT CHANNELS AND
NON-ADJACENT CHANNELS          ~ S41

DETECT COMBINATION OF OUTPUT PORTS TO
OUTPUT ADJACENT CHANNELS          ~ S42

REARRANGE OUTPUT PORTS          ~ S43

DETERMINE MAGNITUDE RELATIONSHIP OF
WAVELENGTHS          ~ S44

SPECIFY CORRESPONDENCE BETWEEN OUTPUT PORT
AND WAVELENGTH          ~ S45

END

FIG. 15A
| STEP ID | ATT#1 | ATT#2 | ATT#3 | | ATT#8 | ADJACENCY DETERMINATION |
|---|---|---|---|---|---|---|
| S1-1 | ON | ON | | | | ADJACENT |
| S1-2 | ON | | ON | | | ADJACENT |
| : | ON | | | ... | | : |
| S1-7 | ON | | | | ON | NON-ADJACENT |
| S1-8 | | ON | ON | | | NON-ADJACENT |
| : | | ON | | ... | | : |
| S1-28 | | | | ... | ON | NON-ADJACENT |
FIG. 15B
| STEP ID | ATT#1 | ATT#2 | ATT#3 | | ATT#8 | ADJACENCY DETERMINATION |
|---|---|---|---|---|---|---|
| S1-1 | ON | ON | | | | ADJACENT |
| S1-2 | ON | | ON | | | ADJACENT |
| S1-13 | | ON | | | ON | ADJACENT |
| : | | | | ... | | : |
| S1-26 | | | | ... | | ADJACENT |
FIG. 15C
PORT #1 & PORT #2, PORT #1 & PORT #3, PORT #2 & PORT #8, ...
FIG. 15D
PORT #6, ..., AND PORT #5, OR PORT #5, ..., AND PORT #6
FIG. 15E
PORT #5, ..., PORT #6
$\lambda a, \cdots \lambda h$
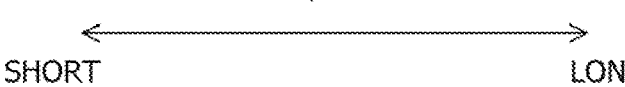
SHORT                       LONG

1

OPTICAL RECEPTION DEVICE AND OPTICAL TRANSMISSION AND RECEPTION DEVICE

CROSS-REFERENCE TO RELATED APPLICATION

This application is based upon and claims the benefit of priority of the prior Japanese Patent Application No. 2021-210719, filed on Dec. 24, 2021, the entire contents of which are incorporated herein by reference.

FIELD

The present case relates to an optical reception device and an optical transmission and reception device.

BACKGROUND

An optical relay device that relays an optical signal in which a service wavelength and an optical supervisory channel (OSC) light are multiplexed in wavelength is known. This optical relay device is equipped with a demultiplexer that demultiplexes and separates the optical signal into the service wavelength and the OSC light, and a demultiplexing device that demultiplexes the service wavelength into wavelengths for the same output destination port. Furthermore, this optical relay device includes a multiplexing device that multiplexes and outputs service wavelengths and a multiplexer that multiplexes and outputs the service wavelength and the OSC light. In addition, an optical demultiplexer that demultiplexes a wavelength-multiplexed signal light for each wavelength and an optical multiplexer that multiplexes signal lights having different wavelengths are also known.

International Publication Pamphlet No. WO 2017/109830, Japanese Laid-open Patent Publication No. 2004-254018, and Japanese Laid-open Patent Publication No. 2019-135524 are disclosed as related art.

SUMMARY

According to an aspect of the embodiments, an optical reception device includes: an optical demultiplexer that has an input port and a plurality of output ports, and configured to demultiplex a wavelength-multiplexed signal light input from the input port into a signal light for each wavelength and output the signal light from each of the plurality of output ports; a multi-wavelength light output circuit configured to output a wavelength light for each wavelength included in the wavelength-multiplexed signal light to the input port of the optical demultiplexer; and a processor configured to control the optical demultiplexer and the multi-wavelength light output circuit, wherein the optical demultiplexer includes a plurality of asymmetric Mach-Zehnder interferometers that each have a pair of arms of different lengths, and a plurality of adjustors respectively that adjust optical phases in the plurality of asymmetric Mach-Zehnder interferometers, the plurality of asymmetric Mach-Zehnder interferometers are connected to each other in a tree-like shape so as to connect the input port and the plurality of output ports, and the processor causes the multi-wavelength light output circuit to sequentially output the wavelength light for each wavelength, and causes the adjustor of the asymmetric Mach-Zehnder interferometer to adjust the optical phase, the asymmetric Mach-Zehnder interferometer being on a route that connects the input port into which the wavelength light from the multi-wavelength light output circuit is input and the output port according to the wavelength of the wavelength light among the plurality of output ports.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a flowchart illustrating an operation example of a control unit according to the first embodiment;

FIG. 8 is a flowchart illustrating an operation example of a control unit according to the second embodiment;

FIG. 12A is a diagram for describing examples of adjacent channels and non-adjacent channels;

FIG. 12B is a diagram for describing examples of adjacent channels and non-adjacent channels;

FIG. 12C is a diagram for describing examples of adjacent channels and non-adjacent channels;

FIG. 14 is a flowchart illustrating an example of a correspondence specifying processing;

FIG. 15A is a diagram illustrating an example of the correspondence specifying processing;

FIG. 15B is a diagram illustrating an example of the correspondence specifying processing;

FIG. 15C is a diagram illustrating an example of the correspondence specifying processing;

FIG. 15D is a diagram illustrating an example of the correspondence specifying processing; and FIG. 15E is a diagram illustrating an example of the correspondence specifying processing.

DESCRIPTION OF EMBODIMENTS

Various types of the above-described optical demultiplexers are known. For example, an optical demultiplexer in which asymmetric Mach-Zehnder interferometers (AMZ) with a pair of arms having different lengths are connected in multi-stages in a tree-like shape is known (hereinafter the optical demultiplexer is referred to as AMZ optical demultiplexer).

By the way, the signal light for each wavelength demultiplexed by the above-described AMZ optical demultiplexer is output from the AMZ in the last stage but the output port is randomly determined depending on an initial optical phase in the pair of arms of each AMZ. For example, it is not possible to uniquely determine from which output port of the AMZ optical demultiplexer the signal light of which wavelength is output. Therefore, there is a problem that each signal light cannot be output from a desired output port. Note that this problem exists not only in the AMZ optical demultiplexer but also in other optical demultiplexers using the AMZ in which the output port of the signal light is randomly determined.

Therefore, in one aspect, an object is to provide an optical reception device and an optical transmission and reception device that uniquely determine a relationship between an output port and a wavelength of a signal light.

Hereinafter, modes for carrying out the present embodiments will be described with reference to the drawings.

First Embodiment

Figure 1:
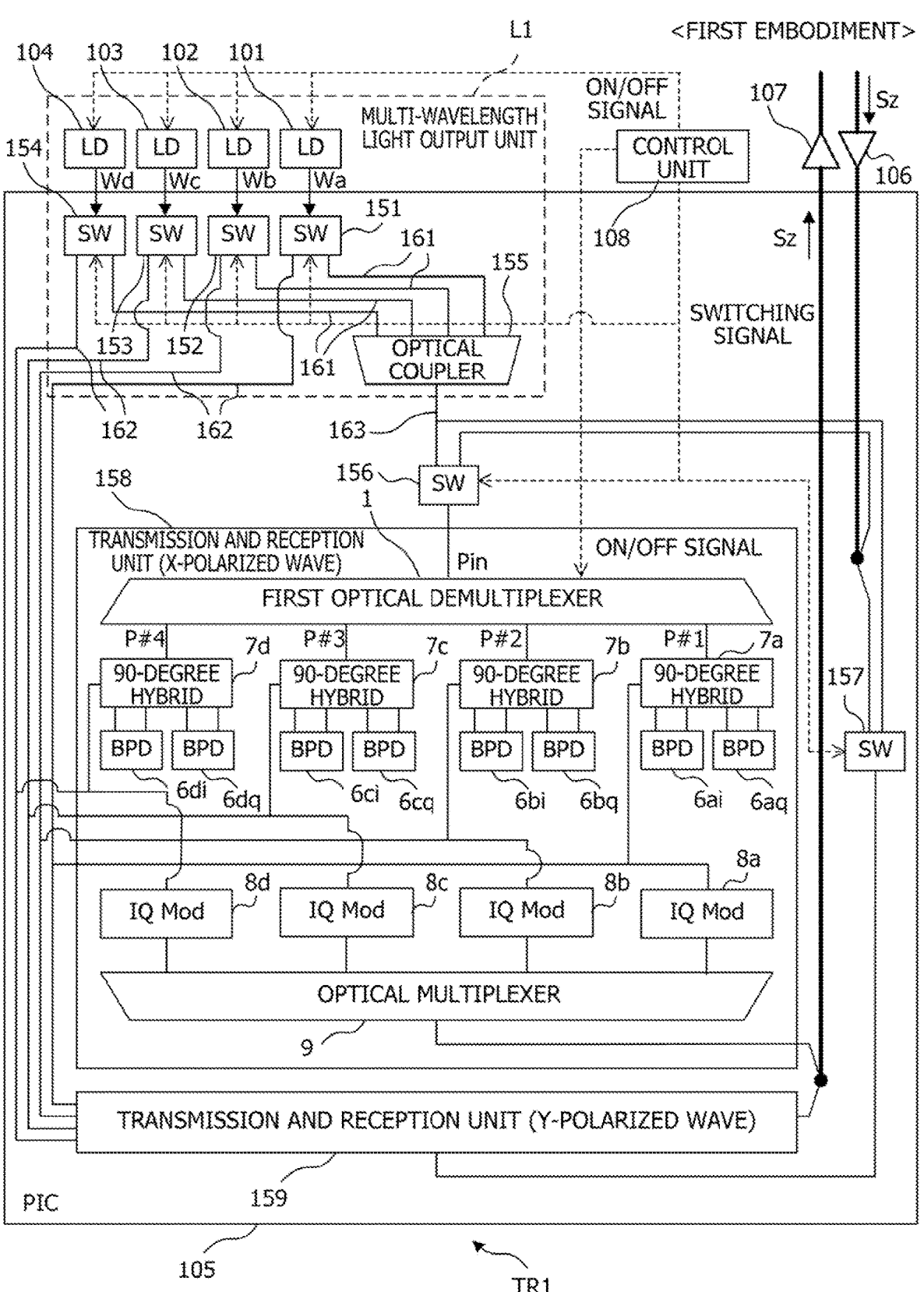
FIG. 1 is an example of an optical transmission and reception device according to a first embodiment.

As illustrated in FIG. 1, an optical transmission and reception device TR1 includes a first laser diode (LD) 101, a second LD 102, a third LD 103, and a fourth LD 104. The first LD 101, the second LD 102, the third LD 103, and the fourth LD 104 are all examples of single wavelength light sources. The first LD 101 to the fourth LD 104 respectively output wavelength lights Wa, Wb, Wc, and Wd having center wavelengths λa to λd at fixed wavelength spacing. In the first embodiment, description will be given using four single wavelength light sources, but the number of the single wavelength light sources is not particularly limited. For example, eight single wavelength light sources may be used.

Furthermore, the optical transmission and reception device TR1 includes a photonics integrated circuit (PIC) 105, optical amplifiers 106 and 107, and a control unit 108. The optical amplifiers 106 and 107 include, for example, an Erbium doped fiber amplifier (EDFA). Both the optical amplifiers 106 and 107 amplify a wavelength-multiplexed signal light Sz, which is a signal light in which wavelengths are multiplexed.

The PIC 105 includes a first switch (SW) 151, a second SW 152, a third SW 153, a fourth SW 154, an optical coupler 155, input light SWs 156 and 157, and transmission and reception units 158 and 159. Each of the first SW 151, the second SW 152, the third SW 153 and the fourth SW 154 has one input end and two output ends. The optical coupler 155 has four input ends and one output end. Each of the input light SWs 156 and 157 has two input ends and one output end. Each of the transmission and reception units 158 and 159 has four first input ends, one second input end, and one output end. The first embodiment will be described using the four switches: the first SW 151, the second SW 152, the third SW 153, and the fourth SW 154, but the number is not particularly limited as long as the number is the same as the number of single wavelength light sources.

Note that the first LD 101, the second LD 102, the third LD 103, the fourth LD 104, the first SW 151, the second SW 152, the third SW 153, the fourth SW 154, and the optical coupler 155 are included in a multi-wavelength light output unit L1.

The input end of the first SW 151 is connected to the first LD 101. The input end of the second SW 152 is connected to the second LD 102. The input end of the third SW 153 is connected to the third LD 103. The input end of the fourth SW 154 is connected to the fourth LD 104. Therefore, a wavelength light Wa output from the first LD 101 is input to the input end of the first SW 151. Since the second SW 152 to the fourth SW 154 are similar to the case of the first SW 151, description thereof is omitted.

Ones of the output ends of the first SW 151, the second SW 152, the third SW 153, and the fourth SW 154 are respectively connected to the four input ends of the optical coupler 155 via a first waveguide 161. The other output ends of the first SW 151, the second SW 152, the third SW 153, and the fourth SW 154 are respectively connected to the four first input ends of each of the transmission and reception units 158 and 159 via a second waveguide 162. For example, the first SW 151, the second SW 152, the third SW 153, and the fourth SW 154 are optical switches that respectively switch waveguide directions of wavelength lights Wa, Wb, Wc, and Wd to either the first waveguide 161 or the second waveguide 162.

One output end of the optical coupler 155 is connected to ones of the input ends of the input light SWs 156 and 157 via a third waveguide 163. For example, the waveguide connecting the optical coupler 155 and the input light SWs 156 and 157 branches in the middle. The other ends of the input ends of the input light SWs 156 and 157 are connected to the optical amplifier 106. The output end of the input light SW 156 is connected to the second input end of the transmission and reception unit 158. The output end of the input light SW 157 is connected to the second input end of the transmission and reception unit 159. For example, the input light SW 156 is an optical switch that switches the wavelength-multiplexed signal light Sz input to each of the second input ends of the transmission and reception units 158 and 159 to any of the wavelength light Wa, Wb, Wc, and Wd.

The transmission and reception units 158 and 159 receive the wavelength-multiplexed signal light Sz and transmit the wavelength-multiplexed signal light Sz. More specifically, when having received the wavelength-multiplexed signal light Sz from the optical amplifier 106, the transmission and reception units 158 and 159 convert the received wavelength-multiplexed signal light Sz into an electrical signal corresponding to the wavelength-multiplexed signal light Sz. When having converted the wavelength-multiplexed signal light Sz into the electrical signal, the transmission and reception units 158 and 159 perform various types of signal processing for the electrical signal and reproduce the electrical signal, and convert the electrical signal after the signal processing into the wavelength-multiplexed signal light Sz. The transmission and reception units 158 and 159 transmit the wavelength-multiplexed signal light Sz converted from the electrical signal to the optical amplifier 107. Note that the transmission and reception unit 158 corresponds to an X-polarized component of the wavelength-multiplexed signal light Sz, and the transmission and reception unit 159 corresponds to the Y-polarized component of the wavelength-multiplexed signal light Sz.

The transmission and reception unit 158 includes a first optical demultiplexer 1, 90-degree hybrid circuits 7a to 7d, balanced photodiodes (BPDs) 6ai to 6di, and 6aq to 6dq, IQ Mods 8a to 8d, and an optical multiplexer 9. The 90-degree hybrid circuits 7a to 7d are examples of wave detection circuits. The IQ Mods 8a to 8d are examples of modulation circuits. In addition, although not illustrated, the transmission and reception unit 158 includes a digital signal processor (DSP), an analogue digital converter (ADC), a digital analogue converter (DAC), and the like that perform the above-described signal processing. The 90-degree hybrid circuits 7a to 7d and IQ Mods 8a to 8d are respectively connected to the four first input ends of the transmission and reception unit 158. Note that since the configuration of the transmission and reception unit 159 is basically similar to the configuration of the transmission and reception unit 158, detailed illustration is omitted in FIG. 1.

By the way, the optical transmission and reception device TR1 can also be an optical reception device by excluding the above-described IQ Mods 8a to 8d, the optical multiplexer 9, and the DAC from the transmission and reception unit 158. In this case, the transmission and reception unit 158 may be simply used as a reception unit. For example, in the case where the optical transmission and reception device TR1 is used as an optical reception device, it is sufficient that the reception unit includes the first optical demultiplexer 1, 90-degree hybrid circuits 7a to 7d, BPDs 6ai to 6di, and 6aq to 6dq, the DSP, and the ADC.

The first optical demultiplexer 1 has one input port and four output ports. The input port of the first optical demultiplexer 1 is connected to the second input end of the transmission and reception unit 158. The first optical demultiplexer 1 demultiplexes the X-polarized component of the wavelength-multiplexed signal light Sz into a signal light Sa of the wavelength λa, a signal light Sb of the wavelength λb, a signal light Sc of the wavelength λc, and a signal light Sd of the wavelength λd.

The 90-degree hybrid circuit 7a uses the wavelength light Wa of the center wavelength λa as local emission of the center wavelength λa, and causes the signal light Sa and the local emission to interfere with each other to detect an I channel (in-phase component) and a Q channel (orthogonal component) in the X-polarized component. For example, the 90-degree hybrid circuit 7a causes the signal light Sa and the local emission to interfere with each other and detects an interference signal, and performs coherent wave detection for detecting amplitude and phase of the signal light Sa. The 90-degree hybrid circuit 7a outputs optical electric field components according to the amplitude and phase of the signal light Sa to the subsequent BPDs 6ai and 6aq, respectively. The BPDs 6ai and 6aq convert the optical electric field component into an electrical analog signal. Note that since the 90-degree hybrid circuits 7b to 7d and the BPDs 6bi to 6di, and 6bq to 6dq are basically similar to the 90-degree hybrid circuits 7a and the BPDs 6ai and 6aq, detailed description thereof is omitted.

The IQ Mod 8a uses the wavelength light Wa of the center wavelength λa as transmission light of the center wavelength λa, and optically modulates the X-polarized component of the transmission light on the basis of the electrical signal after signal processing. The optically modulated X-polarized component of the transmission light of the center wavelength λa is input to the optical multiplexer 9. Note that since the IQ Mods 8b to 8d are basically similar to the IQ Mod 8a, detailed description is omitted.

The optical multiplexer 9 has four input ports and one output port. The output port of the optical multiplexer 9 is connected to the output end of the transmission and reception unit 158. The transmission light of the center wavelength λa, the transmission light of the center wavelength λb, the transmission light of the center wavelength λc, and the transmission light of the center wavelength λd are respectively input to the four input ports of the optical multiplexer 9. The optical multiplexer 9 multiplexes these four transmission lights to generate the X-polarized component of the wavelength-multiplexed signal light Sz. The optical multiplexer 9 outputs the X-polarized component of the wavelength-multiplexed signal light Sz from the output port. The X-polarized component of the wavelength-multiplexed signal light Sz is polarized and synthesized with the Y-polarized component of the wavelength-multiplexed signal light Sz, and is transmitted to the optical amplifier 107 as the wavelength-multiplexed signal light Sz.

The control unit 108 controls the operations of the first LD 101, the second LD 102, the third LD 103, the fourth LD 104, the first SW 151, the second SW 152, the third SW 153, the fourth SW 154, the input light SWs 156 and 157, and the first optical demultiplexer 1. The control unit 108 includes, for example, a hardware circuit such as a field program-mable gate array (FPGA) and a memory. The control unit 108 may be a hardware circuit such as an application specified integrated circuit (ASIC) or a central processing unit (CPU) instead of the FPGA.

For example, the control unit 108 outputs an on/off signal to the first LD 101, the second LD 102, the third LD 103, the fourth LD 104, and the first optical demultiplexer 1 to control the operations of the first LD 101, the second LD 102, the third LD 103, the fourth LD 104, and the first optical demultiplexer 1. For example, in the case of the first LD 101, the on/off signal is a signal for switching output and output stop of the wavelength light Wa. Since the second LD 102, the third LD 103, and the fourth LD 104 are similar to the case of the first LD 101, description thereof is omitted. In the case of the first optical demultiplexer 1, the on/off signal is a signal for switching ON and OFF of the output ports. Note that ON and OFF of the output ports will be described in detail below.

Meanwhile, the control unit 108 outputs a switching signal to the first SW 151, the second SW 152, the third SW 153, the fourth SW 154, and the input light SWs 156 and 157 to control the operations of the first SW 151, the second SW 152, the third SW 153, the fourth SW 154, and the input light SWs 156 and 157. For example, the control unit 108 outputs, to the first SW 151, the switching signal for switching the first SW 151 to the first waveguide 161 side. Furthermore, the control unit 108 outputs, to the input light SW 156, the switching signal for inputting a wavelength light. Therefore, in a case where the wavelength light Wa of the center wavelength λa has been output from the first LD 101, this wavelength light Wa is input to the input port of the first optical demultiplexer 1.

Figure 2:
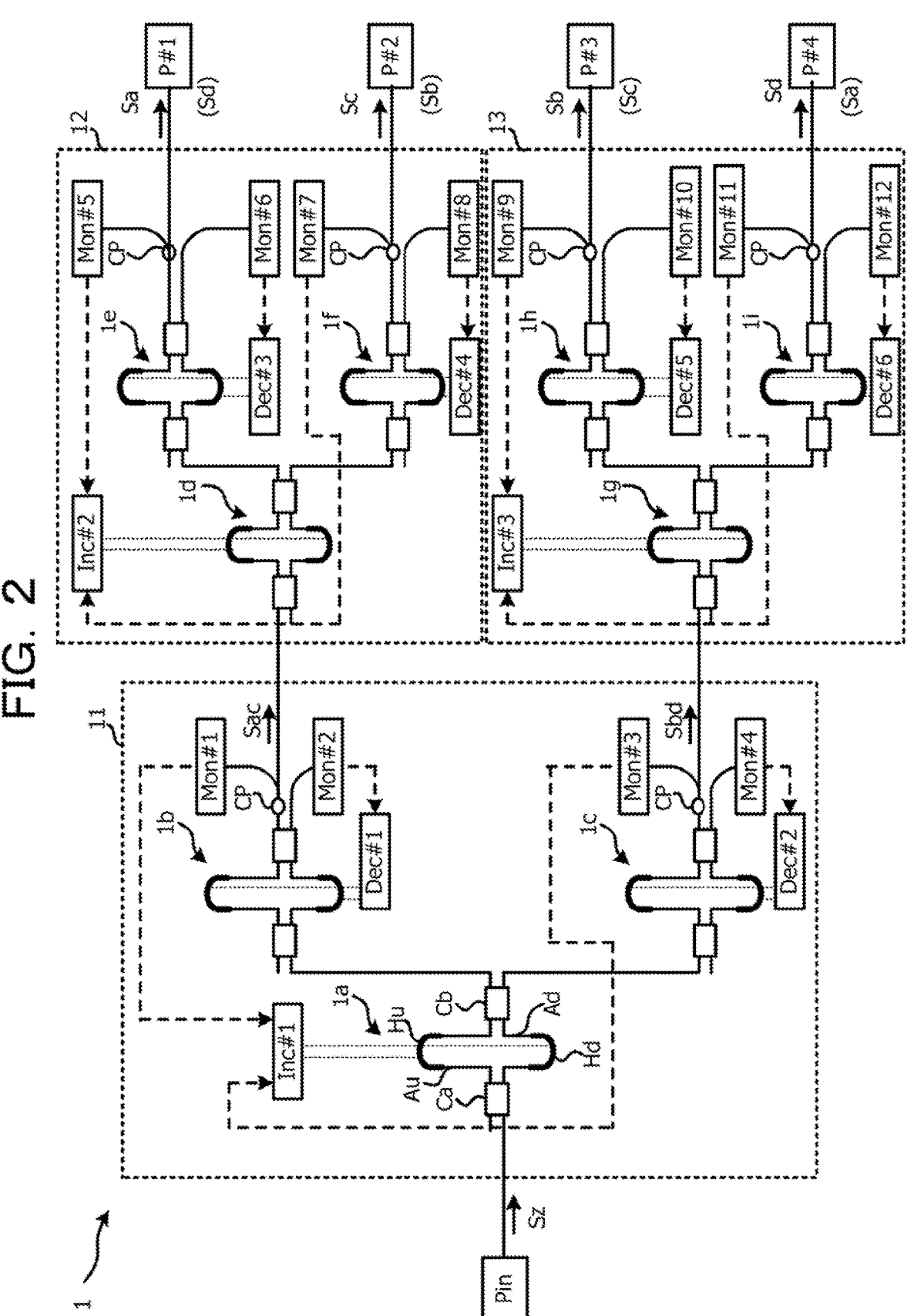
FIG. 2 is an example of a first optical demultiplexer.

Details of the first optical demultiplexer 1 will be described with reference to FIGS. 2 and 3. Note that, in FIG. 3, configurations common to those in FIG. 2 are denoted by the same reference numerals, and detailed description thereof is omitted.

The first optical demultiplexer 1 includes a pre-stage demultiplexing circuit 11 and post-stage demultiplexing circuits 12 and 13 optically connected to the post stage of the pre-stage demultiplexing circuit 11. The first optical demultiplexer 1 demultiplexes the signal lights Sa, Sb, Sc, and Sd of the center wavelengths λa to λd at fixed wavelength spacing from the wavelength-multiplexed signal lights Sz of the four wavelengths λa to λd, as an example. The first optical demultiplexer 1 executes demultiplexing processing in units of each of the pre-stage demultiplexing circuit 11 and the post-stage demultiplexing circuits 12 and 13.

The first optical demultiplexer 1 has AMZs 1a to 1i connected in multi-stages in a tree-like shape. The pre-stage demultiplexing circuit 11 includes the AMZs 1a to 1c, the post-stage demultiplexing circuit 12 includes the AMZs 1d to 1f, and the post-stage demultiplexing circuit 13 includes the AMZs 1g to 1i. For example, the first optical demulti-plexer 1 corresponds to an AMZ optical demultiplexer. Each of the AMZs 1a to 1i includes a pair of arms Au and Ad as an arm pair having different lengths (waveguide lengths), an input coupler Ca, and an output coupler Cb. Each of the AMZs 1a to 1i may have a plurality of arm pairs. For example, the AMZ 1a may have the pair of arms Au and Ad as an arm pair, or may have two or more pairs of arms as arm pairs. Each of the input coupler Ca and the output coupler Cb is a 2×2 coupler including two input ports and two output ports.

The two output ports of the input coupler Ca are optically connected to the input ends of the pair of arms Au and Ad, respectively. The two input ports of the output coupler Cb are optically connected to the output ends of the pair of arms Au and Ad, respectively. The wavelength-multiplexed signal light Sz input to the input coupler Ca is input to the pair of arms Au and Ad.

A phase shifter Hu is provided in the upper arm Au, and a phase shifter Hd is provided in the lower arm Ad. The phase shifters Hu and Hd respectively adjust optical phases of the pair of arms Au and Ad of each of the AMZs 1a to 1i. As a result, a difference between the optical phases caused by variations at the time of manufacturing or the like is compensated. The phase shifters Hu and Hd are heaters formed of a metal (resistor) thin film including, for example, tungsten, titanium, platinum, or the like and change temperatures of waveguides in the arms Au and Ad. Because this changes refractive indexes in the arms Au and Ad, the optical phases in the arms Au and Ad are adjusted. Note that the configurations of the phase shifters Hu and Hd are not limited thereto and may be a unit that electrically changes carrier density in the waveguide of each of the arms Au and Ad by a carrier plasma effect.

Furthermore, to control each of the phase shifters Hu and Hd of the AMZs 1a to 1i, the first optical demultiplexer 1 includes monitor circuits Mon #1 to Mon #12 that monitor power of output lights of the AMZs 1a to 1i, compensation circuits Dec #1 to Dec #6 that decrease the power according to a monitoring result of the power of the output light, and compensation circuits Inc #1 to Inc #3 that increase the power according to the monitoring result of the power of the output light. The compensation circuits Dec #1 to Dec #6 and Inc #1 to Inc #3 are examples of adjustors. The monitor circuits Mon #1 to Mon #12 are implemented by, for example, PDs, and the compensation circuits Dec #1 to Dec #3, and Inc #1 to Inc #3 are implemented by, for example, FPGAs or ASICs.

The monitor circuits Mon #1 to Mon #12 respectively monitor the power of the output light of the AMZs 1b, 1c, 1e, 1f, 1h, and 1i. The compensation circuits Dec #1 to Dec #6 and Inc #1 to Inc #3 compensate the difference between the optical phases by controlling an adjustment amount of the optical phases in the pair of arms Au and Ad for the phase shifters Hu and Hd according to the power of the output light. For example, the compensation circuits Dec #1 to Dec #6 and Inc #1 to Inc #3 control heater power supplied to the phase shifters Hu and Hd.

In the pre-stage demultiplexing circuit 11, the AMZs 1a to 1c, the compensation circuits Inc #1 and Dec #2 and Dec #3, and the monitor circuits Mon #1 to Mon #4 are provided. Each of the AMZs 1b and 1c is optically connected to the post stage of the AMZ 1a. Each of the AMZs 1d and 1g is optically connected to the post stage of the AMZs 1b and 1c. An input port Pin to which any of the wavelength lights Wa to Wd or the wavelength-multiplexed signal light Sz is input is provided at an input end of the AMZ 1a.

The monitor circuits Mon #1 and Mon #3 are optically and respectively connected to the output ports of the output couplers Cb of the AMZs 1b and 1c via a branch coupler CP. The monitor circuit Mon #1 monitors the power of the output light output from the AMZ 1b to the AMZ 1d. The monitor circuit Mon #1 notifies the compensation circuit Inc

1 of the power that is a monitoring result. The monitor circuit Mon #3 monitors the power of the output light output from the AMZ 1c to the AMZ 1g. The monitor circuit Mon #3 notifies the compensation circuit Inc #1 of the power that is a monitoring result.

The monitor circuits Mon #2 and Mon #4 are optically and respectively connected to the another output ports of the output couplers Cb of the AMZ 1b and 1c. Each of the monitor circuits Mon #2 and Mon #4 monitors the power of the output light output from the another output port of the output coupler Cb. The monitor circuit Mon #2 notifies the compensation circuit Dec #1 of the power that is a monitoring result. The monitor circuit Mon #4 notifies the compensation circuit Dec #2 of the power that is a monitoring result.

The compensation circuit Inc #1 controls adjustment amounts of the optical phases for the phase shifters Hu and Hd of the AMZ 1a according to the respective monitoring results of the output light by the monitor circuits Mon #1 and Mon #3. The compensation circuit Dec #1 controls adjustment amounts of the optical phases for the phase shifters Hu and Hd of the AMZ 1b according to the monitoring result of the output light by the monitor circuit Mon #2. The compensation circuit Dec #2 controls adjustment amounts of the optical phases for the phase shifters Hu and Hd of the AMZ 1c according to the monitoring result of the output light by the monitor circuit Mon #4.

With the configuration described above, the power of the output light output from the output ports of the output couplers Cb of the AMZs 1b and 1c to the post stage AMZs 1d and 1g increases, and the power of the output light output from the another output ports of the output couplers Cb of the AMZs 1b and 1c to the monitor circuits Mon #2 and Mon #4 decreases.

In the post-stage demultiplexing circuit 12, the AMZs 1d to 1f, the compensation circuits Inc #2 and Dec #3 and Dec #4, and the monitor circuits Mon #5 to Mon #8 are provided. Each of the AMZs 1e and 1f is optically connected to the post stage of the AMZ 1d. Output ports P #1 and P #2 to which branched light is output are respectively provided in the output ports of the output couplers Cb of the AMZs 1e and 1f. The output port P #1 is connected to the 90-degree hybrid circuit 7a. The output port P #2 is connected to the 90-degree hybrid circuit 7b.

The monitor circuits Mon #5 and Mon #7 are optically and respectively connected to the output ports of the output couplers Cb of the AMZs 1e and 1f via the branch coupler CP. The monitor circuit Mon #5 monitors power of the output light output from the AMZ 1e to the output port P #1. The monitor circuit Mon #5 notifies the compensation circuit Inc #2 of the power that is a monitoring result. The monitor circuit Mon #7 monitors the power of the output light output from the AMZ 1f to the output port P #2. The monitor circuit Mon #7 notifies the compensation circuit Inc #2 of the power that is a monitoring result.

The monitor circuits Mon #6 and Mon #8 are optically and respectively connected to the another output ports of the output couplers Cb of the AMZ 1e and 1f. Each of the monitor circuits Mon #6 and Mon #8 monitors the power of the output light output from the another output port of the output coupler Cb. The monitor circuit Mon #6 notifies the compensation circuit Dec #3 of the power that is a monitoring result. The monitor circuit Mon #8 notifies the compensation circuit Dec #4 of the power that is a monitoring result.

The compensation circuit Inc #2 controls adjustment amounts of the optical phases of the phase shifters Hu and Hd of the AMZ 1$d$ according to the respective output light monitoring results by the monitor circuits Mon #5 and Mon #7. The compensation circuit Dec #3 controls adjustment amounts of the optical phases of the phase shifters Hu and Hd of the AMZ 1$e$ according to the output light monitoring result by the monitor circuit Mon #6. The compensation circuit Dec #4 controls adjustment amounts of the optical phases of the phase shifters Hu and Hd of the AMZ 1$f$ according to the output light monitoring result by the monitor circuit Mon #8.

With the configuration described above, the power of the output light output from the output ports of the output couplers Cb of the AMZs 1$e$ and 1$f$ to the post-stage output ports P #1 and P #2 increases, and the power of the output light output from the another output ports of the output couplers Cb of the AMZs 1$e$ and 1$f$ to the monitor circuits Mon #6 and Mon #8 decreases.

In the post-stage demultiplexing circuit 13, the AMZs 1$g$ to 1$i$, the compensation circuits Inc #3 and Dec #5 and Dec #6, the monitor circuits Mon #9 to Mon #12 are provided. Each of the AMZs 1$h$ and 1$i$ is optically connected to the post stage of the AMZ 1$g$. Output ports P #3 and P #4 to which branched light is output are respectively provided in the output ports of the output couplers Cb of the AMZs 1$h$ and 1$i$. The output port P #3 is connected to the 90-degree hybrid circuit 7$c$. The output port P #4 is connected to the 90-degree hybrid circuit 7$d$.

The monitor circuits Mon #9 and Mon #11 are optically and respectively connected to the output ports of the output couplers Cb of the AMZs 1$h$ and 1$i$ via the branch coupler CP. The monitor circuit Mon #9 monitors each power of the output light output from the AMZ 1$h$ to the output port P #3. The monitor circuit Mon #9 notifies the compensation circuit Inc #3 of the power that is a monitoring result. The monitor circuit Mon #12 monitors the power of the output light output from the AMZ 1$i$ to the output port P #4. The monitor circuit Mon #11 notifies the compensation circuit Inc #3 of the power that is a monitoring result.

The monitor circuits Mon #10 and Mon #12 are optically and respectively connected to the another output ports of the output couplers Cb of the AMZ 1$h$ and 1$i$. Each of the monitor circuits Mon #10 and Mon #12 monitors the power of the output light output from the another output port of the output coupler Cb. The monitor circuit Mon #10 notifies the compensation circuit Dec #5 of the power that is a monitoring result. The monitor circuit Mon #12 notifies the compensation circuit Dec #6 of the power that is a monitoring result.

The compensation circuit Inc #3 controls adjustment amounts of the optical phases of the phase shifters Hu and Hd of the AMZ 1$g$ according to the respective output light monitoring results by the monitor circuits Mon #9 and Mon #11. The compensation circuit Dec #5 controls adjustment amounts of the optical phases of the phase shifters Hu and Hd of the AMZ 1$h$ according to the output light monitoring result by the monitor circuit Mon #10. The compensation circuit Dec #6 controls adjustment amounts of the optical phases of the phase shifters Hu and Hd of the AMZ 1$i$ according to the output light monitoring result by the monitor circuit Mon #12.

With the configuration described above, the power of the output light output from the output ports of the output couplers Cb of the AMZs 1$h$ and 1$i$ to the post-stage output ports P #3 and P #4 increases, and the power of the output light output from the another output ports of the output couplers Cb of the AMZs 1$h$ and 1$i$ to the monitor circuits Mon #10 and Mon #12 decreases.

In this way, the pre-stage demultiplexing circuit 11 and the post-stage demultiplexing circuits 12 and 13 are connected in multi-stages in a tree-like shape so that the wavelength-multiplexed signal light Sz of the center wavelengths λa to λd is input from the AMZ 1$a$ to each of the AMZs 1$b$ and 1$c$, and the wavelength-multiplexed signal lights Sz are respectively input from the AMZs 1$b$ and 1$c$ to the different AMZs 1$d$ and 1$g$ in the post stage. The wavelength spacing of transmission bands of the AMZs 1$a$ to 1$i$ is determined according to an arm length difference thereof. More specifically, the wavelength spacing of the transmission bands of the AMZs 1$a$ to 1$i$ is substantially inversely proportional to the arm length difference thereof.

The arm length difference of the AMZs 1$a$ to 1$c$ is set so that the wavelength spacing of the transmission bands becomes wavelength spacing Δλ of the center wavelengths λa to λd. The arm length difference between the AMZs 1$d$ to 1$f$ and the AMZs 1$g$ to 1$i$ is set to be ½ times of the arm length difference of the AMZs 1$a$ to is so that the wavelength spacing of the transmission bands becomes twice of the center wavelength spacing Δλ (2×Δλ).

Therefore, the pre-stage demultiplexing circuit 11 demultiplexes the wavelength-multiplexed signal light Sz into a wavelength-multiplexed signal light Sac having the center wavelengths λa and λc and a wavelength-multiplexed signal light Sbd having the center wavelengths λb and λd. The post-stage demultiplexing circuit 12 demultiplexes the wavelength-multiplexed signal light Sac into the signal lights Sa and Sc for each of the center wavelengths λa and λc. The post-stage demultiplexing circuit 13 demultiplexes the wavelength-multiplexed signal light Sbd into the signal lights Sb and Sd for each of the center wavelengths λb and λd.

At this time, the output ports P #1 to P #4 of the signal lights Sa to Sd of the center wavelengths λa to λd are randomly determined according to the initial optical phase in the pair of arms Au and Ad of each of the AMZs 1$a$ to 1$i$. Therefore, the signal light Sa of the center wavelength λa may be output from the output port P #1, or the signal light Sd of the center wavelength λd may be output from the output port P #1 as illustrated in the parentheses. Similarly, the signal light Sc of the center wavelength λc may be output or the signal light Sb of the center wavelength λb may be output from the output port P #2. The signal light Sb may be output or the signal light Sc may be output from the output port P #3. The signal light Sd may be output or the signal light Sa may be output from the output port P #4. As described above, the combinations of the signal lights Sa, Sb, Sc, and Sd of the center wavelengths λa to λd and the output ports P #1 to P #4 are not constant.

Therefore, the signal lights Sa, Sb, Sc, and Sd cannot be output to arbitrary output destinations, and it is difficult to perform appropriate signal processing for each of the signal lights Sa, Sb, Sc, and Sd.

For example, a technique of detecting each of the signal light Sa, Sb, Sc, and Sd output from each of the output ports P #1 to P #4, and switching an electrical cross-connect switch for selecting the output destinations of the signal lights Sa, Sb, Sc, and Sd on the basis of detection results is conceivable. Detection of the signal lights Sa, Sb, Sc, and Sd can be implemented by, for example, a PD. By providing a PD and a cross-connect switch between the first optical demultiplexer 1 and the 90-degree hybrid circuits 7$a$ to 7$d$, appropriate signal processing according to the center wavelengths λa to λd can be executed for the respective signal lights Sa, Sb, Sc, and Sd.

However, a scale of an electronic circuit including the cross-connect switch increases as the number of wavelengths increases, and there is a possibility that the electronic circuit cannot be accommodated in one chip. In this case, there is a possibility that wiring across the chips is separately needed. For example, in the case of adopting this technique, there is a possibility that a new problem arises in which the scale and power consumption of the electronic circuit increase as the number of wavelengths increases.

Figure 3:
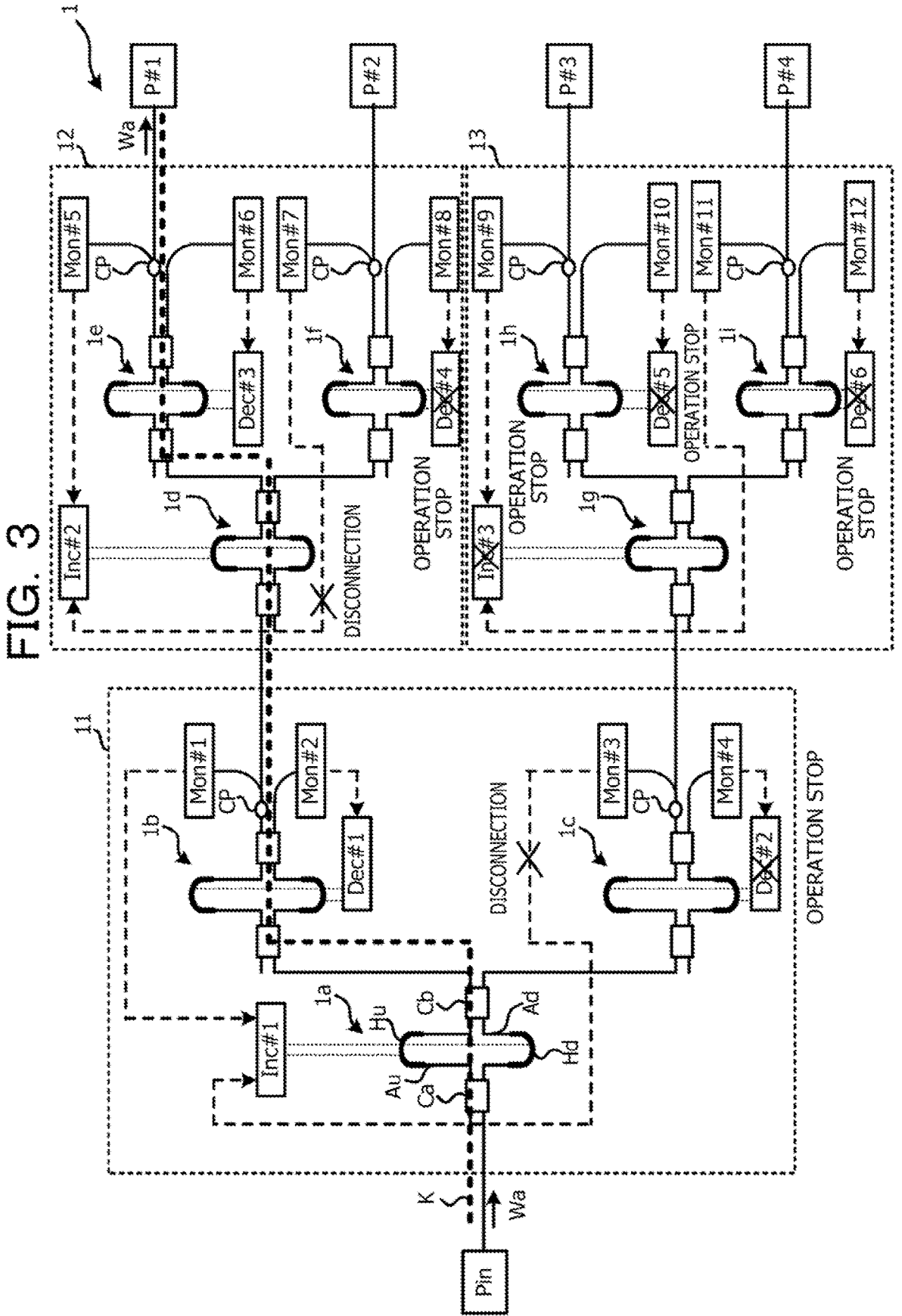
FIG. 3 is a diagram for describing an example of an operation of the first optical demultiplexer.

Here, as illustrated in FIG. 3, by inputting a wavelength light of a specific center wavelength among the center wavelengths λa to λd to the first optical demultiplexer 1 and operating only the compensation circuits Inc #1 to Inc #3 and Dec #1 to Dec #6 on a route from the input port Pin to any one of the output ports P #1 to P #4, the light of the specific center wavelength can be allocated to any one of the output ports P #1 to P #4.

As an example, a method for allocating the output port P #1 to the wavelength light Wa of the center wavelength λa will be exemplified. Only the wavelength light Wa of the center wavelength λa among the center wavelengths λa to λd is input to the input port Pin. The compensation circuits Inc #1 and Dec #1 and Dec #3 on a route K connecting the input port Pin and the output port P #1 operate by the control of the control unit 108 and the other compensation circuits Inc #3 and Dec #2 and Dec #4 to Dec #6 stop operation by the control of the control unit 108 so that the wavelength light Wa of the center wavelength λa is output from the output port P #1. Furthermore, connection between the monitor circuits Mon #3 and Mon #7 and the compensation circuits Inc #1 and Inc #2 is disconnected by the control of the control unit 108 so that the monitoring results of the monitor circuits in a portion other than the route K do not affect the control of the compensation circuits. In the first embodiment, such an operation, stop of the operation, and disconnection of the connection controlled by the control unit 108 are defined as ON of the output port P #1 and OFF of the output ports P #2 to P #4.

By controlling the optical phase along the route K in this way, it is possible to intentionally guide the wavelength light Wa of the center wavelength λa to the output port P #1. Furthermore, by controlling the optical phase as in the above, it is possible to allocate the other respective wavelength lights Wb, Wc, and Wd of the center wavelengths λb to λd to any one of the output ports P #2 to P #4. For example, by turning on the output port P #2 and turning off the output ports P #1 and P #3 to P #4, it is possible to guide the wavelength light Wb of the center wavelength λb to the output port P #2. By turning on the output port P #3 and turning off the output ports P #1 to P #2 and P #4, it is possible to guide the wavelength light Wc of the center wavelength λc to the output port P #3. By turning on the output port P #4 and turning off the output ports P #1 to #3, it is possible to guide the wavelength light Wd of the center wavelength λd to the output port P #4.

Therefore, in the first embodiment, control to uniquely determine the relationship between the output port and the wavelength of the signal light is implemented by the control unit 108 without adopting an electronic circuit including a cross-connect switch, using the above-described method for allocating a light of a specific center wavelength to any one of the output ports P #1 to P #4.

The operation of the control unit 108 according to the first embodiment will be described with reference to FIG. 4.

First, the control unit 108 instructs the first LD 101, the second LD 102, the third LD 103, the fourth LD 104, the first SW 151, the second SW 152, the third SW 153, the fourth SW 154, the input light SWs 156 and 157, and the first optical demultiplexer 1 to be set to an initial state (step S1). More specifically, the control unit 108 outputs, to the first LD 101, the second LD 102, the third LD 103, and the fourth LD 104, the on/off signal for instructing the output stop of the wavelength lights Wa, Wb, Wc, and Wd. The control unit 108 outputs, to the first SW 151, the second SW 152, the third SW 153, and the fourth SW 154, the switching signal for switching the SW to the second waveguide 162 side. The control unit 108 outputs, to the input light SWs 156 and 157, the switching signal for inputting the wavelength-multiplexed signal light Sz. The control unit 108 outputs, to the first optical demultiplexer 1, the on/off signal for instructing OFF of the output ports P #1 to P #4. Therefore, the initial state that is a state before the start of reception operation of the wavelength-multiplexed signal light Sz is maintained.

Next, the control unit 108 outputs, to the input light SWs 156 and 157, the switching signal for inputting the wavelength lights Wa, Wb, Wc, and Wd. The control unit 108 outputs the on/off signal for instructing ON of the output port P #1. The control unit 108 outputs, to the first SW 151, the switching signal for switching the SW to the first waveguide 161 side. The control unit 108 outputs, to the first LD 101, the on/off signal for instructing the output of the wavelength light Wa (step S2). Therefore, the wavelength light Wa is input to the first optical demultiplexer 1. The wavelength light Wa is similarly input to the first optical demultiplexer (not illustrated) of the transmission and reception unit 159. Furthermore, since the output port P #1 of the first optical demultiplexer 1 is switched to be ON, the wavelength light Wa is guided to the output port P #1 (see FIG. 3). In this way, the optical signal of the center wavelength λa can be determined to be the initial optical phase guided to the output port P #1.

Next, the control unit 108 outputs the on/off signal for instructing OFF of the output port P #1 and ON of the output port P #2. The control unit 108 outputs, to the first SW 151, the switching signal for switching the SW to the second waveguide 162 side. The control unit 108 outputs, to the second SW 152, the switching signal for switching the SW to the first waveguide 161 side. The control unit 108 outputs, to the first LD 101, the on/off signal for instructing the output stop of the wavelength light Wa. The control unit 108 outputs, to the second LD 102, the on/off signal for instructing the output of the wavelength light Wb (step S3). Therefore, the input of the wavelength light Wa to the first optical demultiplexer 1 is stopped, and the wavelength light Wb is input to the first optical demultiplexer 1. The wavelength light Wb is similarly input to the first optical demultiplexer (not illustrated) of the transmission and reception unit 159. Furthermore, since the output port P #2 of the first optical demultiplexer 1 is switched to be ON, the wavelength light Wb is guided to the output port P #2. In this way, the optical signal of the center wavelength λb can be determined to be the initial optical phase guided to the output port P #2.

Next, the control unit 108 outputs the on/off signal for instructing OFF of the output port P #2 and ON of the output port P #3. The control unit 108 outputs, to the second SW 152, the switching signal for switching the SW to the second waveguide 162 side. The control unit 108 outputs, to the third SW 153, the switching signal for switching the SW to the first waveguide 161 side. The control unit 108 outputs, to the second LD 102, the on/off signal for instructing the output stop of the wavelength light Wb. The control unit 108 outputs, to the third LD 103, the on/off signal for instructing the output of the wavelength light Wc (step S4). Therefore, the input of the wavelength light Wb to the first optical demultiplexer 1 is stopped, and the wavelength light Wc is input to the first optical demultiplexer 1. The wavelength light Wc is similarly input to the first optical demultiplexer (not illustrated) of the transmission and reception unit 159. Furthermore, since the output port P #3 of the first optical demultiplexer 1 is switched to be ON, the wavelength light Wc is guided to the output port P #3. In this way, the optical signal of the center wavelength λc can be determined to be the initial optical phase guided to the output port P #3.

Next, the control unit 108 outputs the on/off signal for instructing OFF of the output port P #3 and ON of the output port P #4. The control unit 108 outputs, to the third SW 153, the switching signal for switching the SW to the second waveguide 162 side. The control unit 108 outputs, to the fourth SW 154, the switching signal for switching the SW to the first waveguide 161 side. The control unit 108 outputs, to the third LD 103, the on/off signal for instructing the output stop of the wavelength light Wc. The control unit 108 outputs, to the fourth LD 104, the on/off signal for instructing the output of the wavelength light Wd (step S5). Therefore, the input of the wavelength light Wc to the first optical demultiplexer 1 is stopped, and the wavelength light Wd is input to the first optical demultiplexer 1. The wavelength light Wd is similarly input to the first optical demultiplexer (not illustrated) of the transmission and reception unit 159. Furthermore, since the output port P #4 of the first optical demultiplexer 1 is switched to be ON, the wavelength light Wd is guided to the output port P #4. In this way, the optical signal of the center wavelength λd can be determined to be the initial optical phase guided to the output port P #4.

Next, the control unit 108 outputs, to the input light SWs 156 and 157, the switching signal for inputting the wavelength-multiplexed signal light Sz. The control unit 108 outputs the on/off signal for instructing OFF of the output port P #4. The control unit 108 outputs, to the fourth SW 154, the switching signal for switching the SW to the second waveguide 162 side. The control unit 108 outputs, to the fourth LD 104, the on/off signal for instructing the output stop of the wavelength light Wd (step S6). Therefore, the input of the wavelength light Wd to the first optical demultiplexer 1 is stopped. Furthermore, by the processing of steps S2 to S6, the control unit 108 switches ON and OFF in order from the first LD 101 to the fourth LD 104. Therefore, the control unit 108 causes the multi-wavelength light output unit L1 to sequentially output the wavelength lights Wa, Wb, Wc, and Wd for each wavelength.

Next, the control unit 108 outputs the on/off signal for instructing ON of all the output ports P #1 to P #4. The control unit 108 outputs, to each of the first LD 101 to the fourth LD 104, the on/off signal for instructing the output of the wavelength lights Wa, Wb, Wc, and Wd (step S7), and terminates the processing. Therefore, the wavelength lights Wa, Wb, Wc, and Wd are guided to the 90-degree hybrid circuits 7a to 7d as local emission, respectively. Furthermore, due to the above-described initial optical phase, the signal light Sa of the center wavelength λa is output from the output port P #1, and the signal light Sb of the center wavelength λb is output from the output port P #2.

Similarly, the signal light Sc of the center wavelength λc is output from the output port P #3, and the signal light Sd of the center wavelength λc is output from the output port P #4. Since the 90-degree hybrid circuits 7a to 7d are connected to the output ports P #1 to P #4, respectively, the signal lights Sa, Sb, Sc, and Sd are guided to the 90-degree hybrid circuits 7a to 7d, respectively. Therefore, the 90-degree hybrid circuits 7a to 7d can perform the coherent wave detection. Moreover, the wavelength lights Wa, Wb, Wc, and Wd are respectively guided to the IQ Mods 8a to 8d as transmission lights of the center wavelengths λa, λb, λc, and λd. Therefore, the IQ Mods 8a to 8d can perform the optical modulation.

As described above, according to the first embodiment, the correspondence between the output ports P #1 to P #4 and the wavelengths λa, λb, λc, and λd of the signal lights Sa, Sb, Sc, and Sd can be uniquely determined by the control of the control unit 108 without adopting an electronic circuit including a cross-connect switch. For example, in the optical transmission and reception device TR1 adopting the first optical demultiplexer 1 having one input port, such a correspondence can be determined. Furthermore, since the electronic circuit including a cross-connect switch is not adopted, an increase in circuit scale and power consumption can be suppressed.

Second Embodiment

A second embodiment of the present case will be described with reference to FIGS. 5 to 7. Note that, in FIG. 5, configurations common to those in FIG. 1 are denoted by the same or corresponding reference numerals, and detailed description thereof is omitted.

Figure 5:
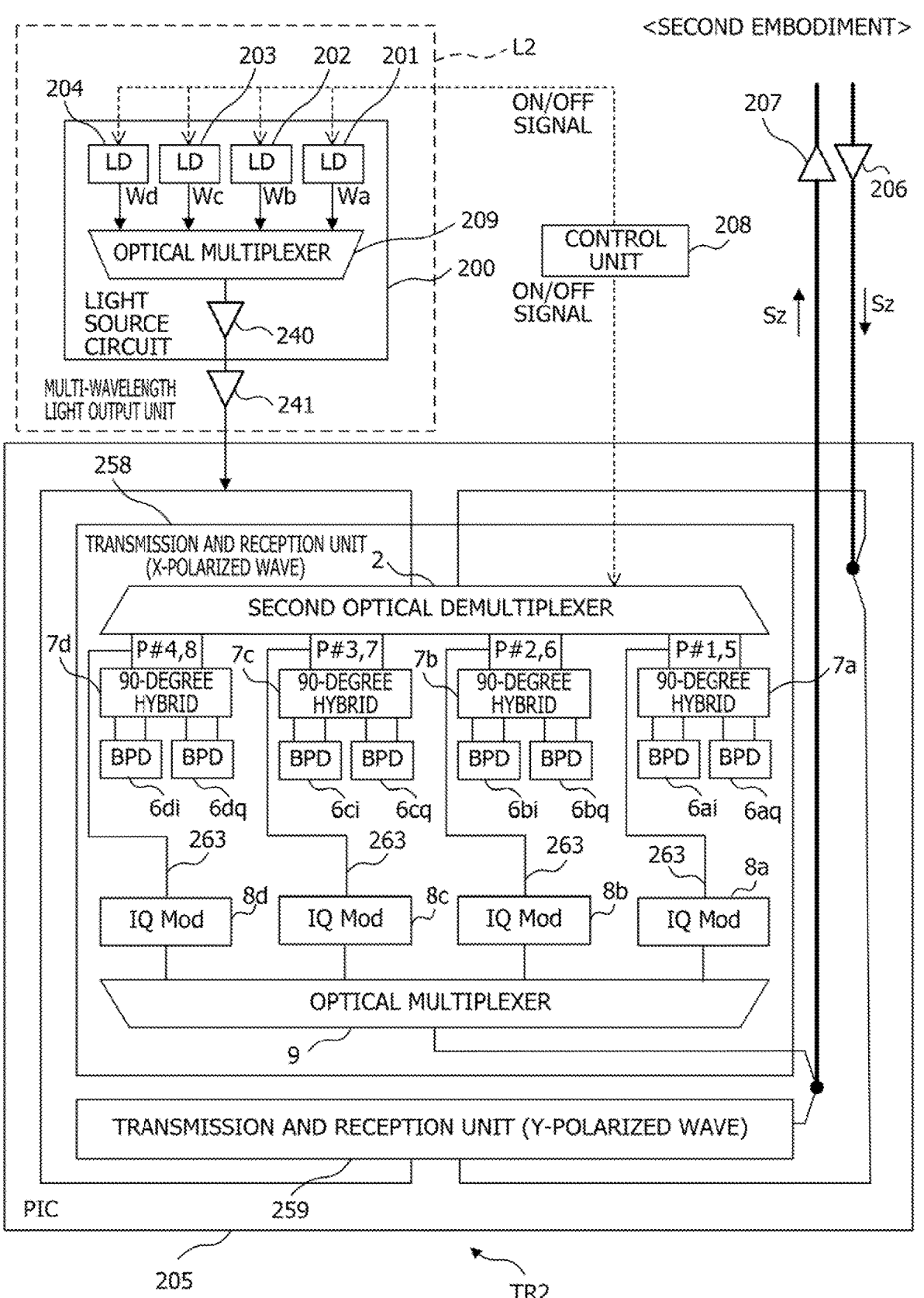
FIG. 5 is an example of an optical transmission and reception device according to a second embodiment.
Figure 6:
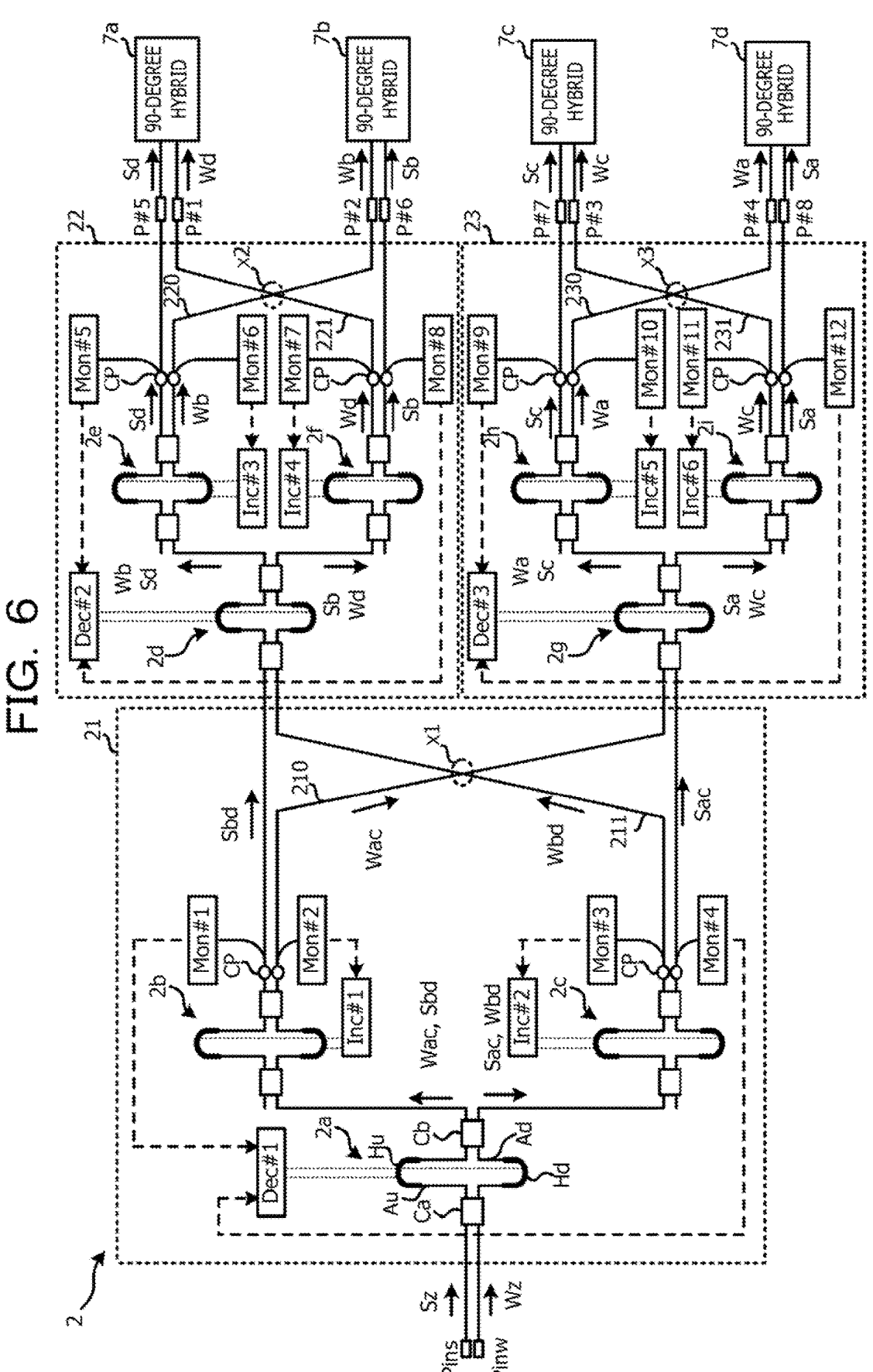
FIG. 6 is an example of a second optical demultiplexer.

As illustrated in FIG. 5, an optical transmission and reception device TR2 includes a first LD 201, a second LD 202, a third LD 203, and a fourth LD 204. The first LD 201 to the fourth LD 204 respectively output wavelength lights Wa, Wb, Wc, and Wd of center wavelengths λa to λd at fixed wavelength spacing. Furthermore, the optical transmission and reception device TR2 includes a PIC 205, optical amplifiers 206, 207, 240, and 241, a control unit 208, and an optical multiplexer 209. The first LD 201, the second LD 202, the third LD 203, the fourth LD 204, the optical multiplexer 209, and the optical amplifier 240 are included in a light source circuit 200 independent of the PIC 205. The light source circuit 200 and the optical amplifier 241 are included in the multi-wavelength light output unit L2.

The optical multiplexer 209 is an example of a multiplexing circuit and includes, for example, an optical combiner. The optical amplifier 240 includes, for example, a semiconductor optical amplifier (SOA). The optical amplifier 241 includes, for example, an EDFA. Each of the optical amplifiers 240 and 241 amplifies any of wavelength lights Wa, Wb, Wc, and Wd or a wavelength-multiplexed wavelength light Wz in which the wavelength lights Wa, Wb, Wc, and Wd are multiplexed. In the case where the optical multiplexer 209 includes an optical combiner, power of the wavelength lights Wa, Wb, Wc, and Wd is reduced by the optical combiner (specifically reduced by a quarter depending on the number of wavelengths), but the optical amplifiers 240 and 241 compensate for this reduction. For example, the power of the wavelength-multiplexed wavelength light Wz to be input to the PIC 205 can be increased as compared with a case of inputting the wavelength lights Wa, Wb, Wc, and Wd to the PIC 205 using the first LD 201 to the fourth LD 204 alone by adopting the optical amplifier 241. Furthermore, since the power of the wavelength-multiplexed wavelength light Wz can be collectively amplified by one optical amplifier 241, the optical amplifier 241 can be easily provided in the optical transmission and reception device TR2. For example, since the number of optical amplifiers 241 is one, a circuit scale of the optical transmission and reception device TR2 can be made small, and power consumption can also be reduced.

The optical multiplexer 209 has four input ends and one output end. The four input ends of the optical multiplexer 209 are optically connected to the first LD 201, the second LD 202, the third LD 203 and the fourth LD 204, respectively. The output end of the optical multiplexer 209 is optically connected to the optical amplifier 240.

The PIC 205 includes transmission and reception units 258 and 259. Each of the transmission and reception units 258 and 259 has two input ends and one output end. The output end of the optical amplifier 241 is connected to one of the input ends of the transmission and reception unit 258. The output end of the optical amplifier 206 is connected to the other of the input ends of the transmission and reception unit 258. For example, both the wavelength-multiplexed wavelength light Wz and a wavelength-multiplexed signal light Sz in which the wavelength lights Wa, Wb, Wc, and Wd are multiplexed are input to the transmission and reception unit 258. Since the transmission and reception unit 259 is basically similar to the transmission and reception unit 258, detailed description thereof is omitted. Furthermore, similarly to the first embodiment, the optical transmission and reception device TR2 can also be an optical reception device by excluding IQ Mods 8a to 8d, an optical multiplexer 9, and a DAC from the transmission and reception unit 258. This also similarly applies to a third embodiment to be described below.

The transmission and reception unit 258 includes a second optical demultiplexer 2, 90-degree hybrid circuits 7a to 7d, BPDs 6ai to 6di, and 6aq to 6dq, IQ Mods 8a to 8d, and the optical multiplexer 9. Although not illustrated, the transmission and reception unit 258 includes a DSP, an ADC, a DAC, and the like, similarly to the first embodiment.

The second optical demultiplexer 2 has two input ports and eight output ports. One of the input ports of the second optical demultiplexer 2 is connected to one of the input ends of the transmission and reception unit 158. The other of the input ports of the second optical demultiplexer 2 is connected to the other of the input ends of the transmission and reception unit 158. The second optical demultiplexer 2 demultiplexes an X-polarized component of the wavelength-multiplexed wavelength light Wz into the wavelength light Wa of the wavelength λa, the wavelength light Wb of the wavelength λb, the wavelength light Wc of the wavelength λc, and the wavelength light Wd of the wavelength λd. Furthermore, the second optical demultiplexer 2 demultiplexes an X-polarized component of the wavelength-multiplexed signal light Sz into a signal light Sa of the wavelength λa, a signal light Sb of the wavelength λb, a signal light Sc of the wavelength λc, and a signal light Sd of the wavelength λd.

The 90-degree hybrid circuits 7a to 7d are connected to the eight output ports of the second optical demultiplexer 2. Any four output ports of the eight output ports output the wavelength light Wa, Wb, Wc, and Wd, respectively, and the remaining four output ports of the eight output ports output signal lights Sa, Sb, Sc, and Sd, respectively. For example, the 90-degree hybrid circuit 7a is connected to an output port P #1 including an output port that outputs the wavelength light Wa and an output port that outputs the signal light Sa. The 90-degree hybrid circuits 7b to 7d are basically similar to the 90-degree hybrid circuits 7a.

Note that the output ports that output the wavelength lights Wa, Wb, Wc, and Wd are also connected to the IQ Mods 8a to 8d. For example, each of the output ports that output the wavelength lights Wa, Wb, Wc, and Wd is connected to the input end of the waveguide 263 including one input end and two output ends. Then, one of the output ends of the waveguide 263 is connected to each of the 90-degree hybrid circuits 7a to 7d, and the other of the output ends is connected to each of the IQ Mods 8a to 8d.

The control unit 208 controls operations of the first LD 201, the second LD 202, the third LD 203, the fourth LD 204, and the second optical demultiplexer 2. For example, the control unit 208 outputs an on/off signal to the first LD 201, the second LD 202, the third LD 203, the fourth LD 204, and the second optical demultiplexer 2 to control the operations of the first LD 201, the second LD 202, the third LD 203, the fourth LD 204, and the second optical demultiplexer 2. For example, in the case of the second optical demultiplexer 2, the on/off signal is a signal for switching ON and OFF of the output ports. Note that ON and OFF of the output ports will be described in detail below.

Details of the second optical demultiplexer 2 will be described with reference to FIGS. 6 and 7. Note that, in FIG. 6, the same components as those in FIG. 2 are denoted by the same or corresponding reference numerals, and description thereof is omitted. Furthermore, in FIG. 7, configurations common to those in FIG. 6 are denoted by the same reference numerals, and detailed description thereof is omitted.

The second optical demultiplexer 2 includes a pre-stage demultiplexing circuit 21 and post-stage demultiplexing circuits 22 and 23 optically connected to the post stage of the pre-stage demultiplexing circuit 21. The second optical demultiplexer 2 demultiplexes the signal lights Sa, Sb, Sc, and Sd of the center wavelengths λa to λd at fixed wavelength spacing from the wavelength-multiplexed signal lights Sz of the four wavelengths λa to λd, as an example. Furthermore, the wavelength lights Wa, Wb, Wc, and Wd of the center wavelengths λa to λd at fixed wavelength spacing is demultiplexed from the wavelength-multiplexed wavelength light Wx of the four wavelengths λa to λd. The second optical demultiplexer 2 executes demultiplexing processing in units of each of a pre-stage demultiplexing circuit 21 and post-stage demultiplexing circuits 22 and 23.

The second optical demultiplexer 2 has AMZs 2a to 2i connected in multi-stages in a tree-like shape. The pre-stage demultiplexing circuit 21 includes the AMZs 2a to 2c, the post-stage demultiplexing circuit 22 includes the AMZs 2d to 2f, and the post-stage demultiplexing circuit 23 includes the AMZs 2g to 2i. For example, the second optical demultiplexer 2 corresponds to an AMZ optical demultiplexer. The AMZs 2a to 2i are connected in multi-stages in a tree-like shape. For example, the AMZs 2b and 2c are optically connected to a post stage of the AMZ 2a, the AMZs 2d and 2g are optically connected to a post stage of the AMZ 2b, and the AMZs 2d and 2g are optically connected to a post stage of the AMZ 2c.

The AMZs 2e and 2f are optically connected to a post stage of the AMZ 2d, and the 90-degree hybrid circuit 7a is optically connected to a post stage of the AMZ 2e via output ports P #1 and P #5. The 90-degree hybrid circuit 7b is optically connected to a post stage of the AMZ 2f via output ports P #2 and P #6. The AMZs 2h and 2i are optically connected to a post stage of the AMZ 2g, and the 90-degree hybrid circuit 7c is optically connected to a post stage of the AMZ 2h via output ports P #3 and P #7. The 90-degree hybrid circuit 7d is optically connected to a post stage of the AMZ 2i via output ports P #4 and P #8. Note that one input ports of the input couplers Ca of the AMZs 2b, 2c, 2e, 2f, 2h, and 2i are open.

The wavelength spacing of the transmission bands of the AMZs 2a to 2i is determined according to the arm length difference thereof. More specifically, the wavelength spacing of the transmission bands of the AMZs 2*a* to 2*i* are substantially inversely proportional to the arm length difference thereof.

The arm length difference of the AMZs 1*a* to 2*c* of the pre-stage demultiplexing circuit 21 is set so that the wavelength spacing of the transmission bands becomes spacing Δλ of the center wavelengths λ*a* to λ*d*. Therefore, the pre-stage demultiplexing circuit 21 transmits and demultiplexes the wavelength-multiplexed signal light Sz and the wavelength-multiplexed wavelength light Wz in the transmission band of the spacing Δλ.

Furthermore, the arm length difference of the AMZs 2*d* to 2*i* is set so that the wavelength spacing of the transmission bands becomes twice of the spacing Δλ (2×Δλ) of the center wavelengths λ*a* to λ*d*. Therefore, the post-stage demultiplexing circuit 22 transmits and demultiplexes the wavelength-multiplexed signal light Sbd and the wavelength-multiplexed wavelength light Wbd in the transmission band of the spacing Δλ. The post-stage demultiplexing circuit 23 transmits and demultiplexes the wavelength-multiplexed signal light Sac and the wavelength-multiplexed wavelength light Wac in the transmission band of the spacing Δλ.

Furthermore, waveguides 210 and 211 extending from one output ports of the output couplers Cb of the AMZs 2*b* and 2*c* intersect at an intersection x1 and are respectively connected to one input ports of the input couplers Ca of the AMZs 2*g* and 2*d* in the post stage. The waveguides 220 and 221 extending from one output ports of the output coupler Cb of the AMZs 2*e* and 2*f* intersect at an intersection x2, and are respectively connected to the 90-degree hybrid circuits 7*b* and 7*a* in the post stage via the output ports P #2 and P #1. The waveguides 230 and 231 extending from one output ports of the output coupler Cb of the AMZs 2*h* and 2*i* intersect at an intersection x3, and are connected to the 90-degree hybrid circuits 7*d* and 7*c* in the post stage via the output ports P #4 and P #3.

In this way, since the pre-stage demultiplexing circuit 21 and the post-stage demultiplexing circuits 22 and 23 have the waveguides intersect at the intersections x1 to x3, sets of the signal lights Sa to Sd and the wavelength lights Wa to Wd having the same center wavelength are respectively input to the 90-degree hybrid circuits 7*a* to 7*d*. For example, the set of the signal light Sd and the wavelength light Wd having the same center wavelength is input to the 90-degree hybrid circuit 7*a*. The 90-degree hybrid circuits 7*b* to 7*d* are basically similar to the 90-degree hybrid circuits 7*a*.

Furthermore, to control each of the phase shifters Hu and Hd of the AMZs 2*a* to 2*i*, the second optical demultiplexer 2 includes monitor circuits Mon #1 to Mon #12 that monitor power of output light, compensation circuits Dec #1 to Dec #3 that decrease the power according to a monitoring result the power of the output light, and compensation circuits Inc #1 to Inc #6 that increase the power according to the result of monitoring the power of the output light. The compensation circuits Dec #1 to Dec #3 and Inc #1 to Inc #6 are examples of adjustors. The monitor circuits Mon #1 to Mon #12 are implemented by, for example, PDs, and the compensation circuits Dec #1 to Dec #3, and Inc #1 to Inc #6 are implemented by, for example, FPGAs or ASICs.

The monitor circuits Mon #1 to Mon #4 and the compensation circuits Dec #1, and Inc #1 and Inc #2 are provided in the pre-stage demultiplexing circuit 21. The monitor circuits Mon #1 and Mon #2 are optically and respectively connected to the pair of output ports of the output coupler Cb of the AMZ 2*b* via a branch coupler CP. The monitor circuit Mon #1 monitors the power of the wavelength-multiplexed signal light Sbd output from the AMZ 2*b* to the AMZ 2*d*.

The monitor circuit Mon #1 notifies the compensation circuit Dec #1 of the power that is a monitoring result. The monitor circuit Mon #2 monitors the power of the wavelength-multiplexed wavelength light Wac output from the AMZ 2*b* to the AMZ 2*g*. The monitor circuit Mon #2 notifies the compensation circuit Inc #1 of the power that is a monitoring result.

The monitor circuits Mon #3 and Mon #4 are optically and respectively connected to the pair of output ports of the output coupler Cb of the AMZ 2*c* via the branch coupler CP. The monitor circuit Mon #3 monitors the power of the wavelength-multiplexed wavelength light Wbd output from the AMZ 2*c* to the AMZ 2*d*. The monitor circuit Mon #3 notifies the compensation circuit Inc #2 of the power that is a monitoring result. The monitor circuit Mon #4 monitors the power of the wavelength-multiplexed signal light Sac output from the AMZ 2*c* to the AMZ 2*g*. The monitor circuit Mon #4 notifies the compensation circuit Dec #1 of the power that is a monitoring result.

The compensation circuit Dec #1 controls adjustment amounts of the optical phases for the phase shifters Hu and Hd of the AMZ 2*a* according to the respective monitoring results of the wavelength-multiplexed signal lights Sbd and Sac by the monitor circuits Mon #1 and Mon #4. The compensation circuit Inc #1 controls the adjustment amounts of the optical phases for the phase shifters Hu and Hd of the AMZ 2*b* according to the monitoring result of the wavelength-multiplexed wavelength light Wac by the monitor circuit Mon #2. The compensation circuit Inc #2 controls the adjustment amounts of the optical phases of the phase shifters Hu and Hd of the AMZ 2*c* according to the monitoring result of the wavelength-multiplexed wavelength light Wbd by the monitor circuit Mon #3.

The monitor circuit Mon #1 is an example of a first monitoring unit that monitors the power of the wavelength-multiplexed signal light Sbd output from the AMZ 2*b* to the AMZ 2*d*, and the monitor circuit Mon #4 is an example of a second monitoring unit that monitors the power of the wavelength-multiplexed signal light Sac output from the AMZ 2*c* to the AMZ 2*g*. Furthermore, the monitor circuit Mon #2 is an example of a third monitoring unit that monitors the power of the wavelength-multiplexed wavelength light Wac output from the AMZ 2*b* to the AMZ 2*g*, and the monitor circuit Mon #3 is an example of a fourth monitoring unit that monitors the power of the wavelength-multiplexed wavelength light Wbd output from the AMZ 2*c* to the AMZ 2*d*.

The monitor circuits Mon #5 to Mon #8 and the compensation circuits Dec #2, and Inc #3 and Inc #4 are provided in the post-stage demultiplexing circuit 22. The monitor circuits Mon #5 and Mon #6 are optically and respectively connected to the pair of output ports of the output couplers Cb of the AMZ 2*e* via the branch coupler CP. The monitor circuit Mon #5 monitors the power of the signal light Sd output from the AMZ 2*e* to the 90-degree hybrid circuit 7*a*. The monitor circuit Mon #5 notifies the compensation circuit Dec #2 of the power that is a monitoring result. The monitor circuit Mon #6 monitors the power of the wavelength light Wb output from the AMZ 2*e* to the 90-degree hybrid circuit 7*b*. The monitor circuit Mon #6 notifies the compensation circuit Inc #3 of the power that is a monitoring result.

The monitor circuits Mon #7 and Mon #8 are optically and respectively connected to the pair of output ports of the output coupler Cb of the AMZ 2*f* via the branch coupler CP. The monitor circuit Mon #7 monitors the power of the wavelength light Wd output from the AMZ 2*f* to the 90-degree hybrid circuit 7a. The monitor circuit Mon #7 notifies the compensation circuit Inc #4 of the power that is a monitoring result. The monitor circuit Mon #8 monitors the power of the signal light Sb output from the AMZ 2f to the 90-degree hybrid circuit 7b. The monitor circuit Mon #8 notifies the compensation circuit Dec #2 of the power that is a monitoring result.

The compensation circuit Dec #2 controls the adjustment amounts of the optical phases for the phase shifters Hu and Hd of the AMZ 2d according to the monitoring results of the monitor circuits Mon #5 and Mon #8. The compensation circuit Inc #3 controls the adjustment amounts of the optical phases for the phase shifters Hu and Hd of the AMZ 2e according to the monitoring result of the monitor circuit Mon #6. The compensation circuit Inc #4 controls the adjustment amounts of the optical phases for the phase shifters Hu and Hd of the AMZ 2f according to the monitoring result of the monitor circuit Mon #7.

The monitor circuits Mon #9 to Mon #12 and the compensation circuits Dec #3, and Inc #5 and Inc #6 are provided in the post-stage demultiplexing circuit 23. The monitor circuits Mon #9 and Mon #10 are optically and respectively connected to the pair of output ports of the output coupler Cb of the AMZ 2h via the branch coupler CP. The monitor circuit Mon #9 monitors the power of the signal light Sc output from the AMZ 2h to the 90-degree hybrid circuit 7c. The monitor circuit Mon #9 notifies the compensation circuit Dec #3 of the power that is a monitoring result. The monitor circuit Mon #10 monitors the power of the wavelength light Wa output from the AMZ 2h to the 90-degree hybrid circuit 7d. The monitor circuit Mon #10 notifies the compensation circuit Inc #5 of the power that is a monitoring result.

The monitor circuits Mon #11 and Mon #12 are optically and respectively connected to the pair of output ports of the output coupler Cb of the AMZ 2i via the branch coupler CP. The monitor circuit Mon #11 monitors the power of the wavelength light We output from the AMZ 2i to the 90-degree hybrid circuit 7c. The monitor circuit Mon #11 notifies the compensation circuit Inc #6 of the power that is a monitoring result. The monitor circuit Mon #12 monitors the power of the signal light Sa output from the AMZ 2i to the 90-degree hybrid circuit 7d. The monitor circuit Mon #12 notifies the compensation circuit Dec #3 of the power that is a monitoring result.

The compensation circuit Dec #3 controls the adjustment amounts of the optical phases for the phase shifters Hu and Hd of the AMZ 2g according to the monitoring results of the monitor circuits Mon #9 and Mon #12. The compensation circuit Inc #5 controls the adjustment amounts of the optical phases for the phase shifters Hu and Hd of the AMZ 2h according to the monitoring result by the monitor circuit Mon #10. The compensation circuit Inc #6 controls the adjustment amounts of the optical phases for the phase shifters Hu and Hd of the AMZ 2i according to the monitoring result by the monitor circuit Mon #11.

Therefore, each of the pre-stage demultiplexing circuit 21 and the post-stage demultiplexing circuits 22 and 23 can demultiplex the wavelength-multiplexed signal light Sz and the wavelength-multiplexed wavelength light Wz with appropriate power.

Figure 7:
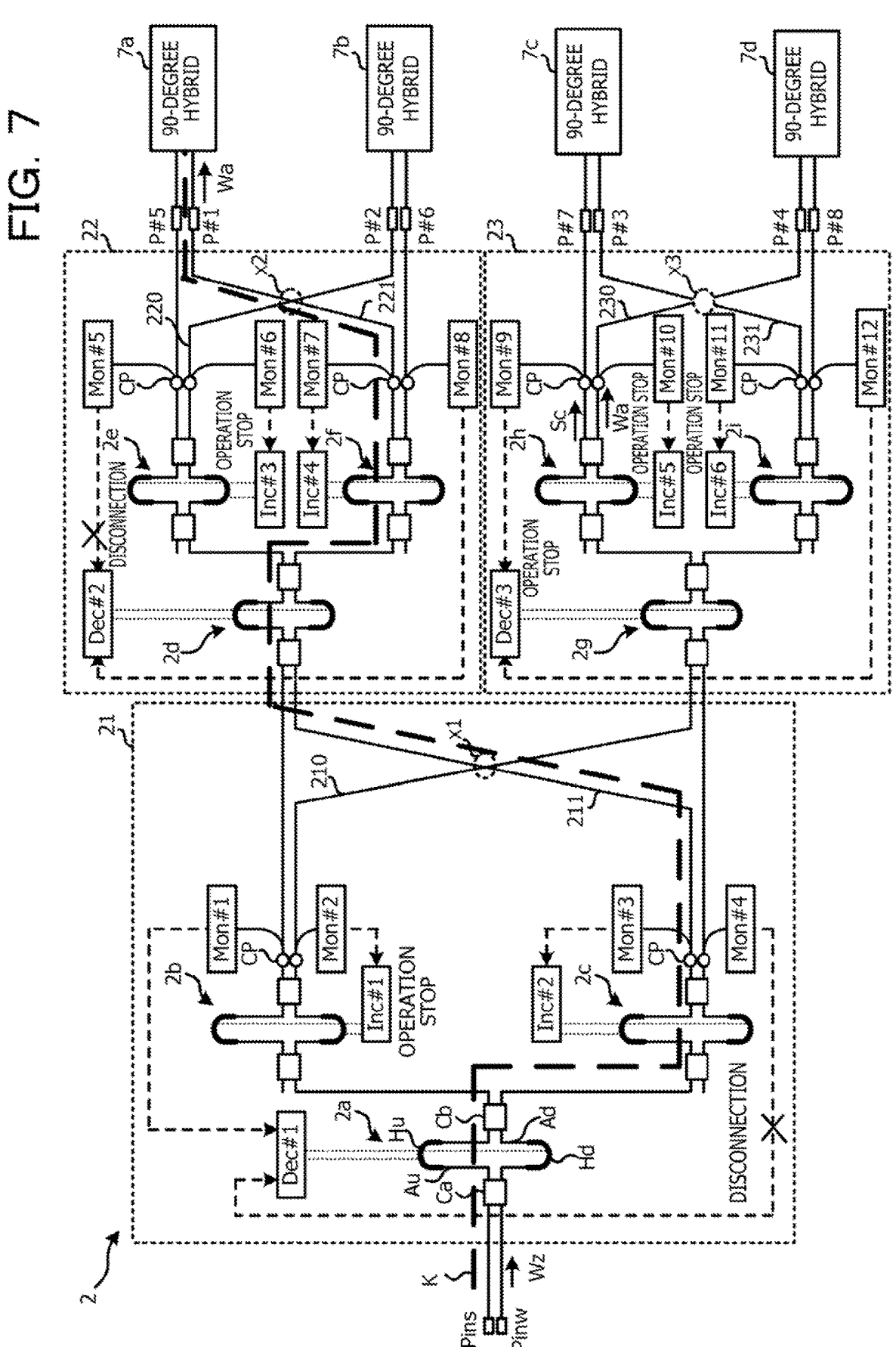
FIG. 7 is a diagram for describing an example of an operation of the second optical demultiplexer.

Here, as described illustrated in FIG. 7, by inputting a wavelength light of a specific center wavelength among the center wavelengths λa to λd to the second optical demultiplexer 2 and operating only the compensation circuits Dec #1 to Dec #3 and Inc #1 to Inc #6 on a route from the input port Pinw to any one of the output ports P #1 to P #4, it is possible to allocate the light of the specific center wavelength to any one of the output ports P #1 to P #4.

As an example, a method for allocating the output port P #1 to the wavelength light Wa of the center wavelength λa will be exemplified. Only the wavelength light Wa of the center wavelength λa among the center wavelengths λa to λd is input to the input port Pinw. The compensation circuits Dec #1 and Dec #2, and Inc #2 and Inc #4 on a route K connecting the input port Pinw and the output port P #1 operate by the control of the control unit 208 and the other compensation circuits Dec #3, Inc #1, Inc #3, and Inc #5 and Inc #6 stop operation by the control of the control unit 208 so that the wavelength light Wa of the center wavelength λa is output from the output port P #1. Furthermore, connection between the monitor circuits Mon #4 and Mon #5 and the compensation circuits Dec #1 and Dec #2 is disconnected by the control of the control unit 208 so that the monitoring results of the monitor circuits in a portion other than the route K do not affect the control of the compensation circuits. In the second embodiment, such an operation, stop of the operation, and disconnection of the connection controlled by the control unit 208 are defined as ON of the output port P #1 and OFF of the output ports P #2 to P #4.

By controlling the optical phase along the route K in this way, it is possible to intentionally guide the wavelength light Wa of the center wavelength λa to the output port P #1. Furthermore, by controlling the optical phase as in the above, it is possible to allocate the other respective wavelength lights Wb, Wc, and Wd of the center wavelengths λb to λd to any of the output ports P #2 to P #4. For example, by turning on the output port P #2 and turning off the output ports P #1 and P #3 to P #4, it is possible to guide the wavelength light Wb of the center wavelength λb to the output port P #2. By turning on the output port P #3 and turning off the output ports P #1 to P #2 and P #4, it is possible to guide the wavelength light Wc of the center wavelength λc to the output port P #3. By turning on the output port P #4 and turning off the output ports P #1 to #3, it is possible to guide the wavelength light Wd of the center wavelength λd to the output port P #4.

Therefore, in the second embodiment, control to uniquely determine the relationship between the output port and the wavelength of the signal light is implemented by the control unit 208 without adopting an electronic circuit including a cross-connect switch, using the above-described method for allocating a light of a specific center wavelength to any one of the output ports P #1 to P #4.

The operation of the control unit 208 according to the second embodiment will be described with reference to FIG. 8.

First, the control unit 208 instructs the first LD 201, the second LD 202, the third LD 203, the fourth LD 204, and the second optical demultiplexer 2 to be set to an initial state (step S11). More specifically, the control unit 208 outputs, to the first LD 201, the second LD 202, the third LD 203, and the fourth LD 204, the on/off signal for instructing the output stop of the wavelength lights Wa, Wb, Wc, and Wd. The control unit 208 outputs, to the second optical demultiplexer 2, the on/off signal for instructing OFF of the output ports P #1 to P #4. Therefore, the initial state that is a state before the start of reception operation of the wavelength-multiplexed signal light Sz is maintained.

Next, the control unit 208 outputs the on/off signal for instructing ON of the output port P #1. The control unit 208 outputs, to the first LD 201, the on/off signal for instructing the output of the wavelength light Wa (step S12). Therefore, the wavelength light Wa is input to the second optical demultiplexer 2. The wavelength light Wa is similarly input to the second optical demultiplexer (not illustrated) of the transmission and reception unit 259. Furthermore, since the output port P #1 of the second optical demultiplexer 2 is switched to be ON, the wavelength light Wa is guided to the output port P #1 (see FIG. 7). In this way, the optical signal of the center wavelength λa can be determined to be the initial optical phase guided to the output port P #1.

Next, the control unit 208 outputs the on/off signal for instructing OFF of the output port P #1 and ON of the output port P #2. The control unit 208 outputs, to the first LD 201, the on/off signal for instructing the output stop of the wavelength light Wa. The control unit 208 outputs, to the second LD 202, the on/off signal for instructing the output of the wavelength light Wb (step S13). Therefore, the input of the wavelength light Wa to the second optical demultiplexer 2 is stopped, and the wavelength light Wb is input to the second optical demultiplexer 2. The wavelength light Wb is similarly input to the second optical demultiplexer (not illustrated) of the transmission and reception unit 259. Furthermore, since the output port P #2 of the second optical demultiplexer 2 is switched to be ON, the wavelength light Wb is guided to the output port P #2. In this way, the optical signal of the center wavelength λb can be determined to be the initial optical phase guided to the output port P #2.

Next, the control unit 208 outputs the on/off signal for instructing OFF of the output port P #2 and ON of the output port P #3. The control unit 208 outputs, to the second LD 202, the on/off signal for instructing the output stop of the wavelength light Wb. The control unit 208 outputs, to the third LD 203, the on/off signal for instructing the output of the wavelength light Wc (step S14). Therefore, the input of the wavelength light Wb to the second optical demultiplexer 2 is stopped, and the wavelength light Wc is input to the second optical demultiplexer 2. The wavelength light Wc is similarly input to the second optical demultiplexer (not illustrated) of the transmission and reception unit 259. Furthermore, since the output port P #3 of the second optical demultiplexer 2 is switched to be ON, the wavelength light Wc is guided to the output port P #3. In this way, the optical signal of the center wavelength λc can be determined to be the initial optical phase guided to the output port P #3.

Next, the control unit 208 outputs the on/off signal for instructing OFF of the output port P #3 and ON of the output port P #4. The control unit 208 outputs, to the third LD 203, the on/off signal for instructing the output stop of the wavelength light Wc. The control unit 208 outputs, to the fourth LD 204, the on/off signal for instructing the output of the wavelength light Wd (step S15). Therefore, the input of the wavelength light Wc to the second optical demultiplexer 2 is stopped, and the wavelength light Wd is input to the second optical demultiplexer 2. The wavelength light Wd is similarly input to the second optical demultiplexer (not illustrated) of the transmission and reception unit 259. Furthermore, since the output port P #4 of the second optical demultiplexer 2 is switched to be ON, the wavelength light Wd is guided to the output port P #4. In this way, the optical signal of the center wavelength λd can be determined to be the initial optical phase guided to the output port P #4. Furthermore, by the processing of steps S12 to S15, the control unit 208 switches ON and OFF in order from the first LD 201 to the fourth LD 204. Therefore, the control unit 208 causes the multi-wavelength light output unit L2 to sequentially output the wavelength lights Wa, Wb, Wc, and Wd for each wavelength.

Next, the control unit 208 outputs the on/off signal for instructing ON of all the output ports P #1 to P #4. The control unit 208 outputs, to each of the first LD 201 to the fourth LD 204, the on/off signal for instructing the output of the wavelength lights Wa, Wb, Wc, and Wd (step S16), and terminates the processing. Therefore, the wavelength lights Wd, Wc, Wb, and Wa are guided to the 90-degree hybrid circuits 7a to 7d as local emission, respectively. Furthermore, due to the above-described initial optical phase, the signal light Sa of the center wavelength λa is output from the output port P #8, and the signal light Sb of the center wavelength λb is output from the output port P #6.

Similarly, the signal light Sc of the center wavelength λc is output from the output port P #7, and the signal light Sd of the center wavelength λc is output from the output port P #5. Since the 90-degree hybrid circuits 7a to 7d are connected to the output ports P #5 to P #8, respectively, the signal lights Sa, Sb, Sc, and Sd are guided to the 90-degree hybrid circuits 7a to 7d, respectively. Therefore, the 90-degree hybrid circuits 7a to 7d can perform the coherent wave detection. Moreover, the wavelength lights Wa, Wb, Wc, and Wd are respectively guided to the IQ Mods 8a to 8d as transmission lights of the center wavelengths λa, λb, λc, and λd. Therefore, the IQ Mods 8a to 8d can perform the optical modulation.

As described above, according to the second embodiment, the correspondence between the output ports P #1 to P #4 and the wavelengths λa, λb, λc, and λd of the signal lights Sa, Sb, Sc, and Sd can be uniquely determined by the control of the control unit 208 without adopting an electronic circuit including a cross-connect switch. Furthermore, as in the second embodiment, since the electronic circuit including a cross-connect switch is not adopted, an increase in circuit scale and power consumption can be suppressed. For example, to collectively amplify the power of the wavelength-multiplexed wavelength light Wz to be input to the PIC 205, adoption of one optical amplifier 241 is sufficient, and the circuit scale of the optical transmission and reception device TR2 can be reduced.

Third Embodiment

A third embodiment of the present case will be described with reference to FIG. 9. Note that, in FIG. 9, configurations common to those in FIG. 5 are denoted by the same or corresponding reference numerals, and detailed description thereof is omitted. Furthermore, since an operation of a control unit 308 according to the third embodiment is basically similar to the operation of the control unit 208 according to the second embodiment, detailed description thereof is omitted.

Figure 9:
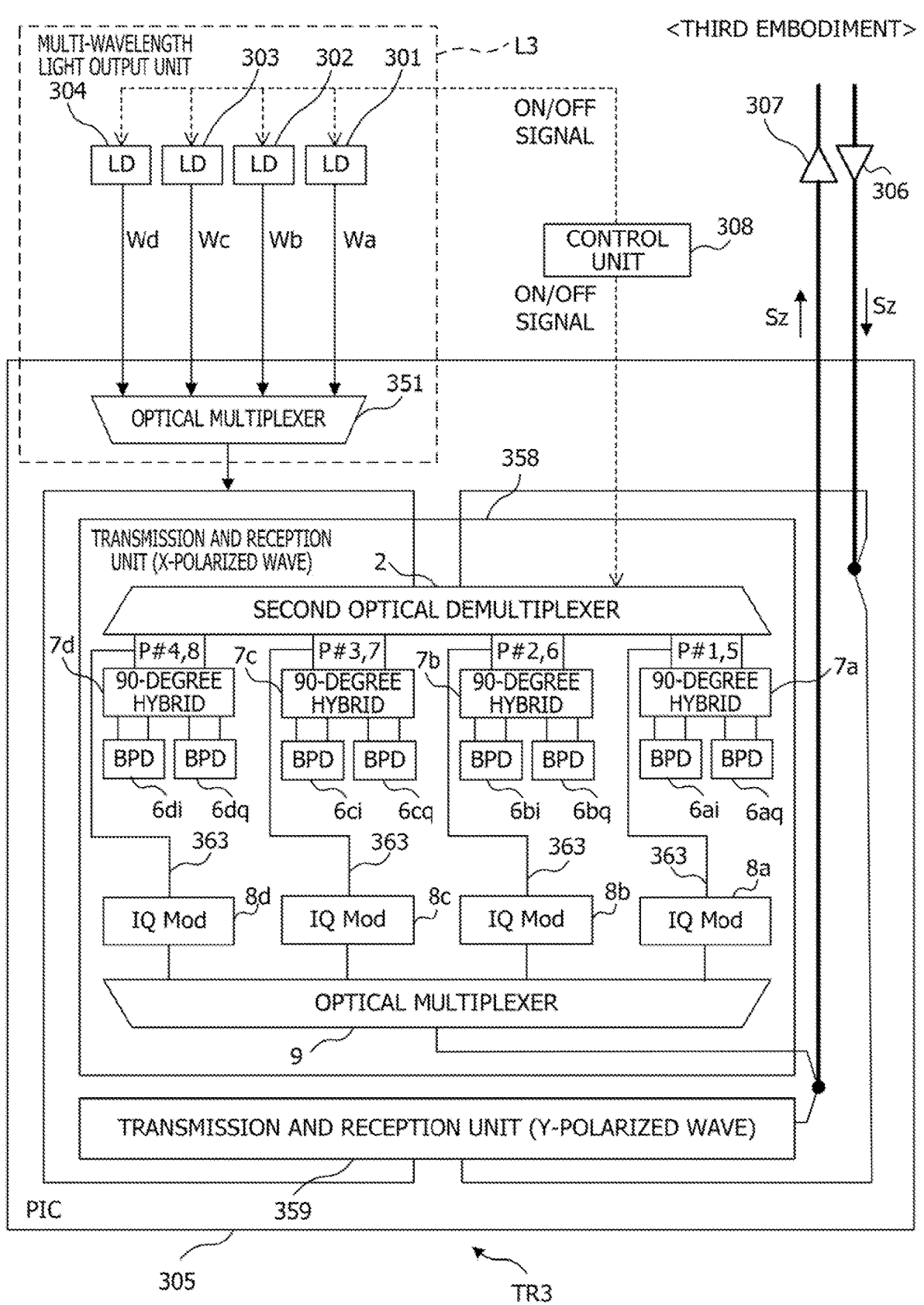
FIG. 9 is an example of an optical transmission and reception device according to a third embodiment.

As illustrated in FIG. 9, an optical transmission and reception device TR3 includes a first LD 301, a second LD 302, a third LD 303, and a fourth LD 304. The first LD 301 to the fourth LD 304 respectively output wavelength lights Wa, Wb, Wc, and Wd of center wavelengths λa to λd at fixed wavelength spacing. Furthermore, the optical transmission and reception device TR3 includes a PIC 305, optical amplifiers 306 and 307, and a control unit 308. In the third embodiment, the PIC 305 includes an optical multiplexer 351. The optical multiplexer 351 is an example of a multiplexing circuit, and includes, for example, a wavelength division multiplexing (WDM) coupler. The optical multiplexer 351 is directly connected to a second optical demultiplexer 2. Note that the first LD 301, the second LD 302, the third LD 303, the fourth LD 304, and the optical multiplexer 351 are included in a multi-wavelength light output unit L3.

As described above, as in the third embodiment, the correspondence between output ports P #1 to P #4 and the wavelengths λa, λb, λc, and λd of signal lights Sa, Sb, Sc, and Sd can be uniquely determined by the control of the control unit 308 without adopting an electronic circuit including a cross-connect switch. Furthermore, as in the third embodiment, since the electronic circuit including a cross-connect switch is not adopted, an increase in circuit scale and power consumption can be suppressed. For example, in the case where the optical multiplexer 351 includes a WDM coupler, power of the wavelength lights Wa, Wb, Wc, and Wd does not have to be reduced as compared with a case of adopting an optical combiner.

Fourth Embodiment

A fourth embodiment of the present case will be described with reference to FIGS. 10, 15A to 15E. Note that, in FIG. 10, the same components as those in FIG. 5 are denoted by the same or corresponding reference numerals, and description thereof is omitted.

Figure 10:
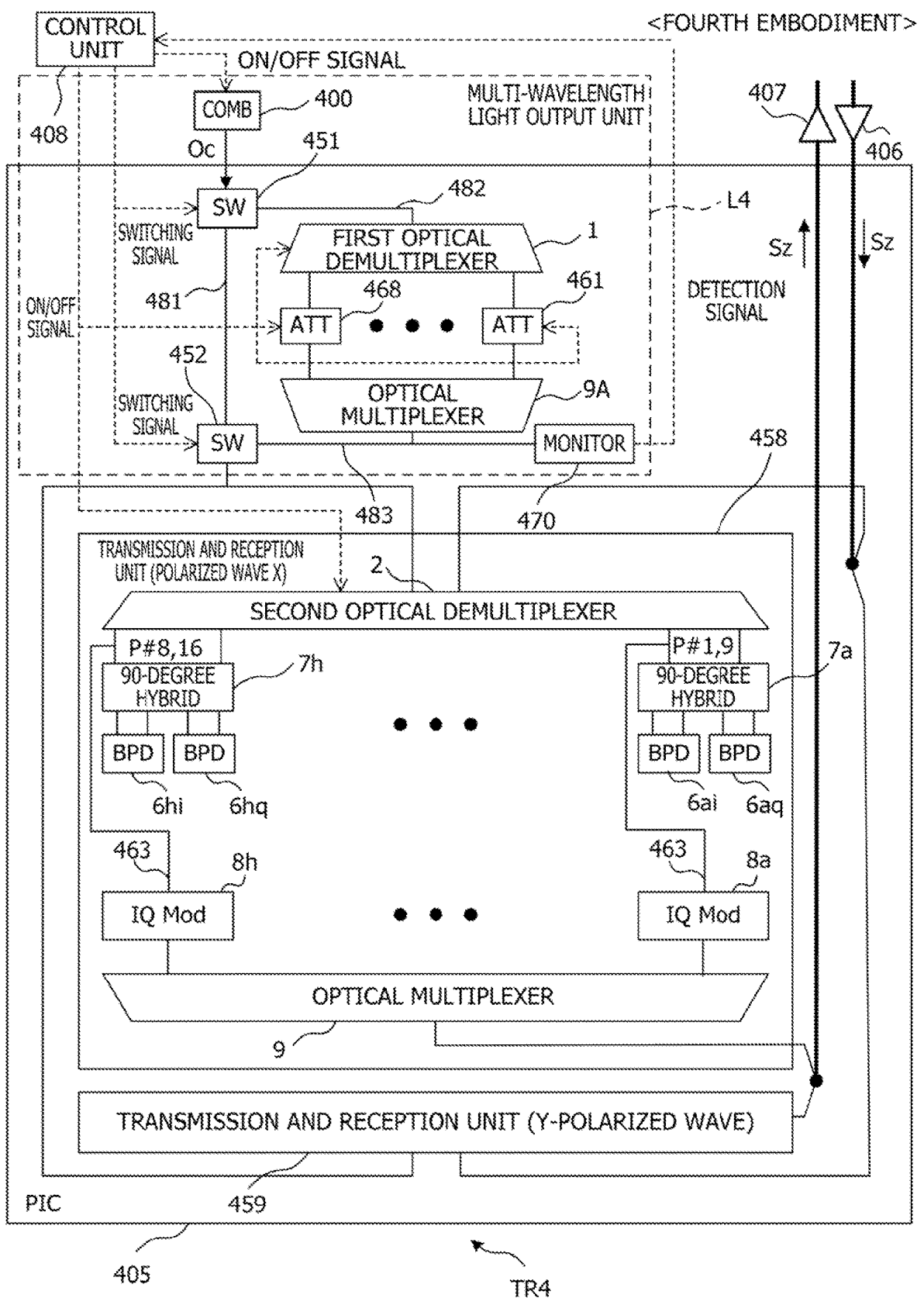
FIG. 10 is an example of an optical transmission and reception device according to a fourth embodiment.

As illustrated in FIG. 10, an optical transmission and reception device TR4 includes an optical frequency comb generator (hereinafter referred to as a comb light source) 400. The comb light source 400 outputs an optical frequency comb (hereinafter referred to as an optical comb) Oc in which center wavelengths λa to λh are arranged at equal wavelength spacing. Furthermore, the optical transmission and reception device TR4 includes a PIC 405, optical amplifiers 406 and 407, and a control unit 408. Note that the comb light source 400 cannot switch the operation for each wavelength, unlike the first LD 101 described in the first to third embodiments.

The PIC 405 is equipped with an optical comb first SW 451, an optical comb second SW 452, transmission and reception units 458 and 459, eight attenuators (ATTs) 461 to 468, a monitor 470, a first optical demultiplexer 1, and an optical multiplexer 9A. The optical comb first SW 451 has one input end and two output ends. The optical comb second SW 452 has two input ends and one output end. Each of the transmission and reception units 458 and 459 has two input ends and one output end. The input end of the optical comb first SW 451 is connected to the comb light source 400. One of the output ends of the optical comb first SW 451 is connected to one of the input ends of the optical comb second SW 452 via a first waveguide 481. The other of the output ends of the optical comb first SW 451 is connected to the input port of the first optical demultiplexer 1 via a second waveguide 482.

Therefore, the optical comb Oc is input to either the optical comb second SW 452 or the first optical demultiplexer 1. In the case where the optical comb Oc is input to the first optical demultiplexer 1, a wavelength light Wa of a center wavelength λa, a wavelength light Wb of a center wavelength λb, . . . or a wavelength light Wh of a center wavelength λh is randomly output from eight output ports of the first optical demultiplexer 1. Note that the other of the input ends of the optical comb second SW 452 is connected to the output port of the optical multiplexer 9A via a third waveguide 483.

The eight ATTs 461 to 468 are arranged between the first optical demultiplexer 1 and the optical multiplexer 9A. Each input end of the ATTs 461 to 468 is connected to the eight output ports of the first optical demultiplexer 1. Therefore, the wavelength light Wa, the wavelength light Wb, . . . , and the wavelength light Wh are input to the ATTs 461 to 468. Each output end of the ATTs 461 to 468 is connected to the input port of the optical multiplexer 9A. Therefore, the wavelength light Wa, the wavelength light Wb, . . . , and the wavelength light Wh are input to the optical multiplexer 9A.

The ATTs 461 to 468 switch transmission and disconnection of the wavelength light Wa, wavelength light Wb, . . . , and the wavelength light Wh on the basis of an on/off signal output from the control unit 408. For example, when the control unit 408 outputs the on/off signal for instructing ON of the ATTs 461 to 468, the ATTs 461 to 468 transmit the wavelength light Wa, the wavelength light Wb, . . . , and the wavelength light Wh. When the control unit 408 outputs the on/off signal for instructing OFF of the ATTs 461 to 468, the ATTs 461 to 468 block the wavelength light Wa, the wavelength light Wb, . . . , and the wavelength light Wh. For example, the ATTs 461 to 468 may be rephrased as corresponding to an on/off switch. Note that one output end of the optical multiplexer 9A is connected to the monitor 470. For example, the waveguide connecting the optical multiplexer 9A and the optical comb second SW 452 branches in the middle.

The output end of the optical comb second SW 452 is connected to one of the input ends of the transmission and reception unit 458. The output end of the optical amplifier 406 is connected to the other of the input ends of the transmission and reception unit 458. For example, both the wavelength-multiplexed wavelength light Wz and the wavelength-multiplexed signal light Sz in which the wavelength light Wa, the wavelength light Wb, . . . , and the wavelength light Wh are multiplexed are input to the transmission and reception unit 458.

Since the transmission and reception unit 459 is basically similar to the transmission and reception unit 458, detailed description thereof is omitted. Furthermore, similarly to the first embodiment, the optical transmission and reception device TR4 can also be an optical reception device by excluding IQ Mods 8a to 8h, an optical multiplexer 9, and a DAC from the transmission and reception unit 458. Note that the comb light source 400, the optical comb first SW 451, the optical comb second SW 452, the first optical demultiplexer 1, the optical multiplexer 9A, the ATTs 461 to 468, and the monitor 470 are included in a multi-wavelength light output unit L4.

Figure 11:
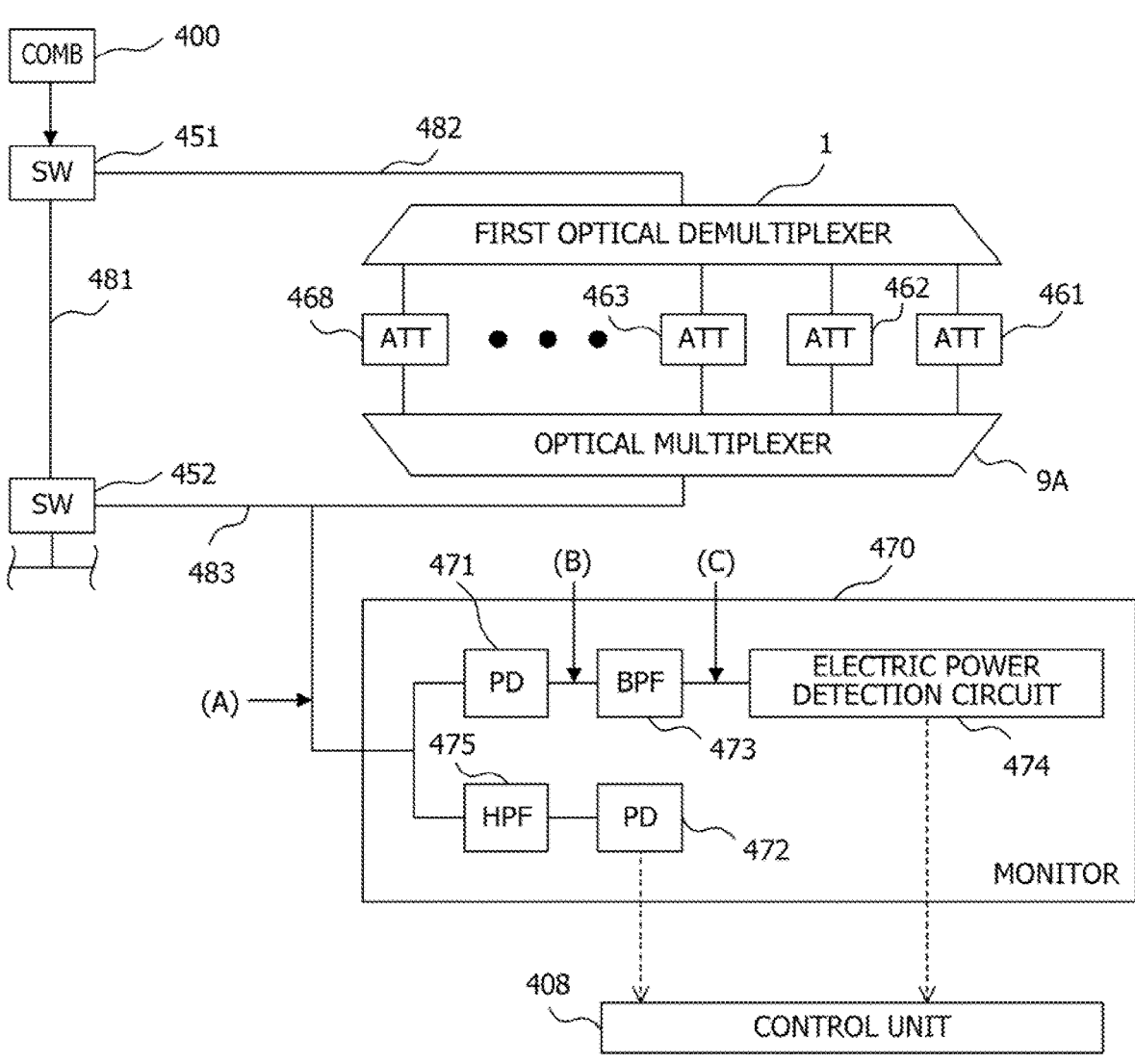
FIG. 11 illustrates an example of a monitor.

As illustrated in FIG. 11, the monitor 470 includes PDs 471 and 472, band pass filter (BPF) 473, an electric power detection circuit 474, and a high pass filter (HPF) 475. A low pass filter (LPF) may be adopted instead of the HPF 475.

The PD471 detects the power of the wavelength-multiplexed wavelength light Wz at point (A) in FIG. 11. For example, when the optical comb Oc is output in a state where the control unit 408 has turned on any two of the ATTs 461 to 468, the PD 471 detects power having a small frequency difference or detects power having a large frequency difference in some cases, as illustrated in FIG. 12A.

The BPF 473 uses a frequency of the power on a low frequency side as a reference frequency in the power of the electrical signal at point (B) in FIG. 11 according to the wavelength-multiplexed wavelength light Wz, and transmits a specific frequency of the power separated by an amount corresponding to an adjacent channel from the reference frequency toward a high frequency side. For example, as illustrated in FIG. 12B, if the specific frequency of power P1 separated from the reference frequency "0" is included in the PB in the pass band (transmission band), the BPF 473 transmits the specific frequency of the power P1. If the specific frequency of power P2 separated from the reference frequency "0" is not included in the PB in the pass band (transmission band), the BPF 473 blocks the specific frequency of the power P2.

The electric power detection circuit 474 detects the power of the electrical signal at point (C) in FIG. 11. If the specific frequency of the power P1 is transmitted, the power detected by the electric power detection circuit 474 shows positive as illustrated in FIG. 12C. Therefore, it can be detected that the wavelengths of the wavelength lights output from any two of the ATTs 461 to 468 turned on by the control unit 408 correspond to adjacent channels. On the other hand, if the specific frequency of the power P2 is not transmitted, the power detected by the electric power detection circuit 474 shows 0 (zero). Therefore, it can be detected that the wavelengths of the wavelength lights output from any two of the ATTs 461 to 468 turned on by the control unit 408 correspond to non-adjacent channels. The electric power detection circuit 474 outputs a detection result to the control unit 408.

The HPF 475 outputs high frequency power by removing low frequency power of the wavelength light of the highest wavelength output from any one of the ATTs 461 to 468. The HPF 475 outputs high frequency power by removing low frequency power of the wavelength light of the lowest wavelength output from any one of the ATTs 461 to 468. The PD 472 compares the two high frequency powers output from the HPF 475, determines a magnitude relationship of the wavelengths, and outputs a determination result to the control unit 408.

The operation of the control unit 408 according to the fourth embodiment will be described with reference to FIGS. 13 to 15.

Figure 13:
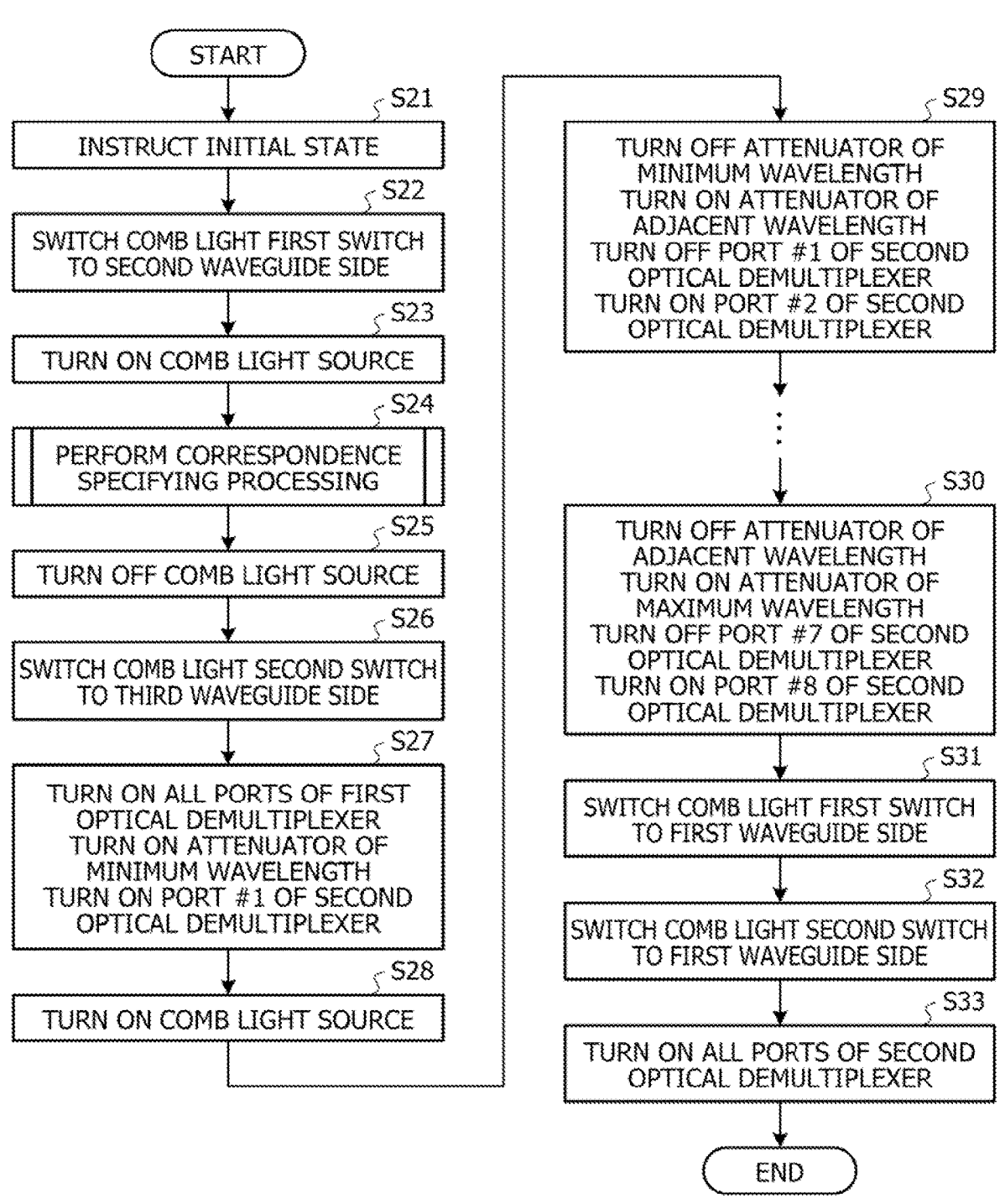
FIG. 13 is a flowchart illustrating an operation example of a control unit according to the fourth embodiment.

First, as illustrated in FIG. 13, the control unit 408 instructs the comb light source 400, the optical comb first SW 451, the optical comb second SW 452, the ATTs 461 to 468, the first optical demultiplexer 1, and the second optical demultiplexer 2 to be set to an initial state (step S21). More specifically, the control unit 408 outputs, to the comb light source 400, the on/off signal for instructing output stop of the optical comb Oc. The control unit 408 outputs, to the optical comb first SW 451 and the optical comb second SW 452, a switching signal for switching the SWs to the first waveguide 481 side. The control unit 408 outputs, to the ATTs 461 to 468, the on/off signal for instructing OFF of the ATTs 461 to 468. The control unit 408 outputs, to the first optical demultiplexer 1 and the second optical demultiplexer 2, the on/off signal for instructing OFF of the output ports P #1 to P #4. Therefore, the initial state that is a state before the start of reception operation of the wavelength-multiplexed signal light Sz is maintained.

Next, the control unit 408 switches the optical comb first SW 451 to the second waveguide 482 side (step S22) and turns on the comb light source 400 (step S23). For example, the control unit 408 outputs, to the optical comb first SW 451, the switching signal for switching the SW to the second waveguide 482 side. After outputting the switching signal, the control unit 408 outputs, to the comb light source 400, the on/off signal for instructing the output of the optical comb Oc. Therefore, the optical comb Oc is input to the first optical demultiplexer 1.

Next, the control unit 408 executes correspondence specifying processing (step S24). The correspondence specifying processing is processing for specifying the correspondence between the eight output ports of the first optical demultiplexer 1 and the wavelengths λa to λh.

Here, details of the correspondence specifying processing will be described with reference to FIG. 14 and the like. When the control unit 408 starts the correspondence specifying processing, the control unit 408 first determines between the adjacent channels and non-adjacent channels (step S41). For example, the control unit 408 outputs, to the ATTs 461 and 462, the on/off signal for instructing ON of the ATTs 461 and 462. Therefore, the wavelength lights of any two of the wavelengths of the optical comb Oc are output from the ATTs 461 and 462 and input to the optical multiplexer 9A, and the wavelength-multiplexed wavelength light Wz in which the two wavelengths are multiplexed is input to the PD 471.

The control unit 408 determines whether the two wavelengths or frequencies of the wavelength-multiplexed wavelength light Wz correspond to the adjacent channels or non-adjacent channels, as illustrated in FIGS. 12A to 12C, on the basis of the wavelength-multiplexed wavelength light Wz. When the two wavelengths or frequencies correspond to the adjacent channels, as illustrated in FIG. 15A, step Identifier (ID) "S1-1", ATT #1 "ON" for identifying the ATT 461, ATT #2 "ON" for identifying the ATT 462, and adjacent channel "adjacent" are registered in a table of a memory provided in the control unit 408.

Next, the control unit 408 outputs, to the ATT 462, the on/off signal for instructing OFF of the ATT 462, and outputs, to the ATT 463, the on/off signal for instructing ON of the ATT 463. Therefore, the wavelength lights of any two wavelengths of the optical comb Oc are output from the ATTs 461 and 463 and input to the optical multiplexer 9A, and the wavelength-multiplexed wavelength light Wz in which the two wavelengths are multiplexed is input to the PD 471. Therefore, the wavelength lights of any two wavelengths of the optical comb Oc are output from the ATTs 461 and 463 and input to the optical multiplexer 9A, and the wavelength-multiplexed wavelength light Wz in which the two wavelengths are multiplexed is input to the PD 471. By repeating such processing, as illustrated in FIG. 15A, the combination of two in the ATT #1 to ATT #8 corresponding to the adjacent channels and the combination of two in the ATT #1 to ATT #8 corresponding to the non-adjacent channels can be determined.

When having determined the adjacent channels and the non-adjacent channels, the control unit 408 detects the output ports that outputs the adjacent channels (step S42). For example, the control unit 408 excludes adjacency determination "non-adjacent" from the table illustrated in FIG. 15A, and extracts the table in which the adjacency determination "adjacent" is registered as illustrated in FIG. 15B. Then, the control unit 408 detects a combination of the output ports that output the adjacent channels, as illustrated in FIG. 15C on the basis of the extracted table.

When having detected the output ports, the control unit 408 rearranges the output ports (step S43). For example, the control unit 408 rearranges the output ports by causing the combinations of the output ports to be adjoined. Therefore, as illustrated in FIG. 15D, for example, a first pattern in which the port #5 is located at the beginning and the port #6 is located at the end, and a second pattern in which the port #6 is located at the beginning and the port #5 is located at the end are generated. Even if the first pattern and the second pattern are compared, at present, the control unit 408 cannot determine which of the port #5 and the port #6 has the longest wavelength.

Therefore, after rearranging the output ports, the control unit 408 determines the magnitude relationship of the wavelengths (step S44). For example, when the control unit 408 turns on only the ATT #5 corresponding to the port #5, the wavelength light having the longest wavelength or the shortest wavelength is output from the output port of the port #5. The control unit 408 detects first power of the wavelength light output from the output port of the port #5 after passing through the HPF 475. Next, when the control unit 408 turns off the ATT #5 and turns on only the ATT #6 corresponding to the port #6, the wavelength light having the longest wavelength or the shortest wavelength is output from the output port of the port #6. The control unit 408 detects second power of the wavelength light output from the output port of the port #6 after passing through the HPF 475. Then, the control unit 408 determines the magnitude relationship of the wavelengths on the basis of the magnitude relationship between the first power and the second power. For example, when the second power is larger than the first power, the control unit 408 determines that the wavelength light output from the port #6 has the longest wavelength λh and the wavelength light output from the port #5 has the longest wavelength λa. Note that, in the fourth embodiment, the wavelength λa<the wavelength λb< . . . <the wavelength λh.

When having determined the magnitude relationship of the wavelengths, the control unit 408 specifies the correspondence between the output port and the wavelength (step S45) and terminates the processing. Therefore, as illustrated in FIG. 15E, it can be specified that the wavelength light having the minimum wavelength λa is output from the output port of the port #5, and the wavelength light having the longest wavelength λh is output from the output port of the port #6.

Note that, regarding the wavelengths λb, . . . , and λg located between the minimum wavelength λa and the longest wavelength λh, the correspondence can be specified according to an arrangement order of the output ports. For example, the wavelength λb can be associated with the output port of the port #4. The wavelength λg can be associated with the output port of the port #7. The same similarly applies to the remaining wavelengths λc, . . . , and λf as in the cases of the wavelengths λb and λg.

Returning to FIG. 13, when completing execution of the correspondence specifying processing, the control unit 408 turns off the comb light source 400 (step S25) and switches the optical comb second SW 452 to the third waveguide 483 side (step S26). For example, the control unit 408 outputs, to the comb light source 400, the on/off signal for instructing the output stop of the optical comb Oc. After outputting the on/off signal, the control unit 408 outputs, to the optical comb second SW 452, the switching signal for switching the SW to the third waveguide 483 side.

Next, the control unit 408 outputs the on/off signal for instructing ON of all the output ports P #1 to P #8 of the first optical demultiplexer 1. The control unit 408 outputs the on/off signal for instructing ON of the ATT #5 of the output port P #5 corresponding to the minimum wavelength λa. The control unit 408 outputs the on/off signal for instructing ON of the output port P #1 of the second optical demultiplexer 2 (step S27). Then, the control unit 408 turns on the comb light source 400 (step S28). Therefore, the optical comb Oc is input to the first optical demultiplexer 1. Since the ATT #5 is independently turned on, the wavelength light Wa of the minimum wavelength λa is input to the second optical demultiplexer 2 via the optical multiplexer 9A. Since the output port #1 of the second optical demultiplexer 2 is turned on, the wavelength light Wa is output from the output port #1 of the second optical demultiplexer 2.

Next, the control unit 408 turns off the ATT #5 corresponding to the minimum wavelength λa and turns on the ATT #4 corresponding to the adjacent wavelength λb adjacent to the minimum wavelength λa. The control unit 408 outputs the on/off signal for instructing OFF of the output port #1 and ON of the output port #2 of the second optical demultiplexer 2 (step S29). As a result, the wavelength light Wb of the wavelength λb is input to the second optical demultiplexer 2 via the optical multiplexer 9A. Since the output port #2 of the second optical demultiplexer 2 is turned on, the wavelength light Wb is output from the output port #2 of the second optical demultiplexer 2.

Hereinafter, the control unit 408 sequentially executes similar processing and turns off the ATT #7 corresponding to the adjacent wavelength λg and turns on the ATT #6 corresponding to the maximum wavelength λh. The control unit 408 outputs the on/off signal for instructing OFF of the output port #7 and ON of the output port #8 of the second optical demultiplexer 2 (step S30). Therefore, the wavelength light Wh of the wavelength λh is input to the second optical demultiplexer 2 via the optical multiplexer 9A. Since the output port #8 of the second optical demultiplexer 2 is turned on, the wavelength light Wh is output from the output port #8 of the second optical demultiplexer 2. By the processing of steps S27 to S30, the initial optical phase of the second optical demultiplexer 2 can be determined. Furthermore, by the processing of steps S27 to S30, the control unit 108 switches ON and OFF in order from the ATT 461 to the ATT 468. Therefore, the control unit 408 causes the multi-wavelength light output unit L4 to sequentially output the wavelength lights Wa, . . . , and Wh for each wavelength.

When the processing of step S30 is completed, the control unit 408 switches the optical comb first SW 451 to the first waveguide 481 side (step S31) and switches the optical comb second SW 452 to the first waveguide 481 side (step S32). Therefore, the optical comb Oc is input to the second optical demultiplexer 2 via the first waveguide 481. When the processing of step S32 is completed, the control unit 408 outputs the on/off signal for instructing ON of all the output ports #1 to #8 of the second optical demultiplexer 2 (step S33) and terminates the processing. Since the initial optical phase of the second optical demultiplexer 2 is determined, the optical comb Oc input to the second optical demultiplexer 2 is demultiplexed by the second optical demultiplexer 2. Therefore, each of the wavelength lights Wa to Wh for each wavelength is output from the output ports #1 to #8 of the second optical demultiplexer 2.

As described above, according to the fourth embodiment, the correspondence between the output ports P #1 to P #8 and the wavelengths λa, . . . , and λh of the optical comb Oc can be uniquely determined by the control of the control unit 408 without adopting an electronic circuit including a cross-connect switch. Furthermore, as in the fourth embodiment, since the electronic circuit including a cross-connect switch is not adopted, an increase in circuit scale and power consumption can be suppressed and the correspondence thereof can be determined. For example, in the fourth embodiment, the comb light source 400, the operation of which for each wavelength cannot be switched, can be adopted.

Although the preferred embodiments have been described in detail thus far, the present embodiments are not limited to specific embodiments, and various modifications and alterations may be made within the scope of the present embodiments described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical reception device comprising:

an optical demultiplexer that has an input port and a plurality of output ports, and configured to demultiplex a wavelength-multiplexed signal light input from the input port into a signal light for each wavelength and output the signal light from each of the plurality of output ports;

a multi-wavelength light output circuit configured to output a wavelength light for each wavelength included in the wavelength-multiplexed signal light to the input port of the optical demultiplexer; and a processor configured to control the optical demultiplexer and the multi-wavelength light output circuit, wherein the optical demultiplexer includes a plurality of asymmetric Mach-Zehnder interferometers that each have a pair of arms of different lengths, and a plurality of adjustors respectively that adjust optical phases in the plurality of asymmetric Mach-Zehnder interferometers, the plurality of asymmetric Mach-Zehnder interferometers are connected to each other in a tree-like shape so as to connect the input port and the plurality of output ports, and the processor causes the multi-wavelength light output circuit to sequentially output the wavelength light for each wavelength, and causes the adjustor of the asymmetric Mach-Zehnder interferometer to adjust the optical phase, the asymmetric Mach-Zehnder interferometer being on a route that connects the input port into which the wavelength light from the multi-wavelength light output circuit is input and the output port according to the wavelength of the wavelength light among the plurality of output ports.

2. The optical reception device according to claim 1, wherein the input port is one, the wavelength-multiplexed signal light and the wavelength light are selectively input to the input port, the multi-wavelength light output circuit has a plurality of single wavelength light sources, and a plurality of switches that switches an output destination of the wavelength light output from each of the plurality of single wavelength light sources to either a first waveguide or a second waveguide, the number of switches being same as the number of the plurality of single wavelength light sources, and an optical coupler that couples each of the first waveguides and one third waveguide, and each of the second waveguides is connected to a plurality of wave detection circuits for each wavelength that detects the signal light, using the wavelength light as local emission.

3. The optical reception device according to claim 1, wherein the input ports are two, and the wavelength-multiplexed signal light is input to one of the input ports and a wavelength-multiplexed wavelength light in which the wavelength lights are multiplexed is input to the other of the input ports, and the multi-wavelength light output circuit includes a plurality of single wavelength light sources, and a multiplexing circuit that multiplexes each wavelength light output from the plurality of single wavelength light source with the wavelength-multiplexed wavelength light.

4. The optical reception device according to claim 3, wherein the multiplexing circuit includes an optical combiner, and an optical amplifier is provided between the optical combiner and the optical demultiplexer.

5. The optical reception device according to claim 3, wherein the multiplexing circuit includes a WDM coupler, and the WDM coupler and the optical demultiplexer are directly connected to each other.

6. The optical reception device according to claim 1, wherein the input ports are two, and the wavelength-multiplexed signal light is input to one of the input ports and an optical frequency comb that includes a plurality of wavelengths is input to the other of the input ports, and the multi-wavelength light output circuit includes an optical frequency comb generator that generates the optical frequency comb, a demultiplexing circuit that demultiplexes the optical frequency comb output by the optical frequency comb generator to the wavelength light for each wavelength, and a multiplexing circuit that multiplexes the wavelength lights after determining a length relationship of the wavelengths by an on and off switching operation.

7. The optical reception device according to claim 6, wherein a plurality of attenuators is provided between the demultiplexing circuit and the multiplexing circuit, and the processor determines the length relationship of the wavelengths by performing the switching operation for the plurality of attenuators.

8. An optical transmission and reception device comprising: an optical demultiplexer that has an input port and a plurality of output ports, and configured to demultiplex a wavelength-multiplexed signal light input from the input port into a signal light for each wavelength and output the signal light from each of the plurality of output ports; a multi-wavelength light output circuit configured to output a wavelength light for each wavelength included in the wavelength-multiplexed signal light to the input port of the optical demultiplexer; and a processor configured to control the optical demultiplexer and the multi-wavelength light output circuit, wherein the optical demultiplexer includes a plurality of asymmetric Mach-Zehnder interferometers each that have a pair of arms of different lengths, and a plurality of adjustors respectively that adjust optical phases in the plurality of asymmetric Mach-Zehnder interferometers, the plurality of asymmetric Mach-Zehnder interferometers are connected to each other in a tree-like shape so as to connect the input port and the plurality of output ports, the processor causes the multi-wavelength light output circuit to sequentially output the wavelength light for each wavelength, and causes the adjustor of the asymmetric Mach-Zehnder interferometer to adjust the optical phase, the asymmetric Mach-Zehnder interferometer being on a route that connects the input port into which the wavelength light from the multi-wavelength light output circuit is input and the output port according to the wavelength of the wavelength light among the plurality of output ports, the input port is one, the wavelength-multiplexed signal light and the wavelength light are selectively input to the input port, the multi-wavelength light output circuit has a plurality of single wavelength light sources, and a plurality of switches that switches an output destination of the wavelength light output from each of the plurality of single wavelength light sources to either a first waveguide or a second waveguide, the number of switches being same as the number of the plurality of single wavelength light sources, and an optical coupler that couples each of the first waveguides and one third waveguide, and each of the second waveguides is connected to a plurality of wave detection circuits for each wavelength that detects the signal light, using the wavelength light as local emission, and a plurality of modulation circuits for each wavelength that optically modulates an electrical signal according to the signal light, using the wavelength light as a transmission light.

* * * * *